Fig. 3.

April 16, 1957 W. E. ERICKSON 2,788,904
BOXCAR UNLOADERS
Filed May 28, 1954 17 Sheets-Sheet 6

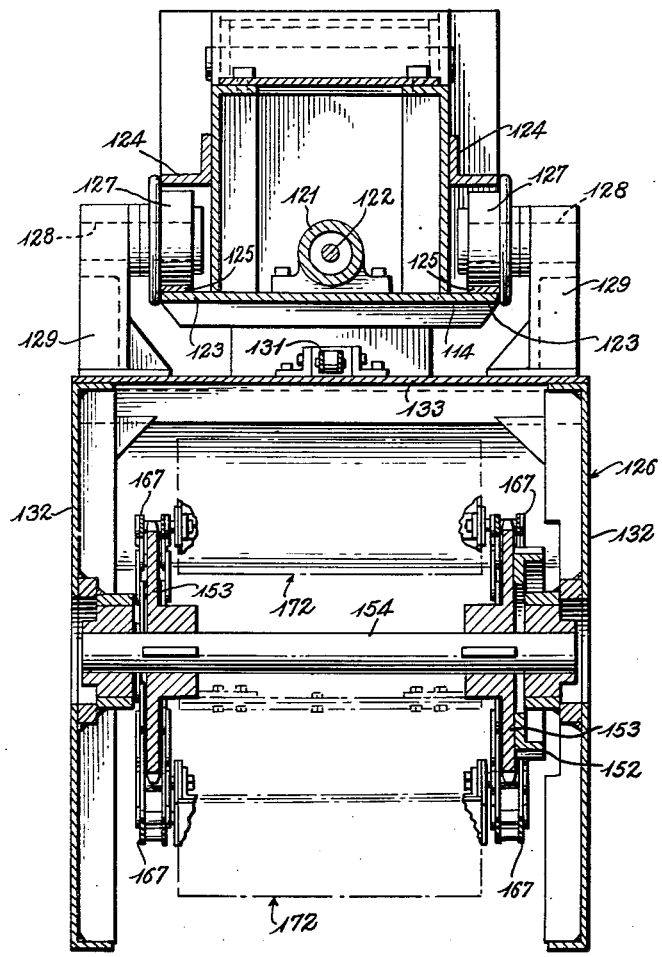

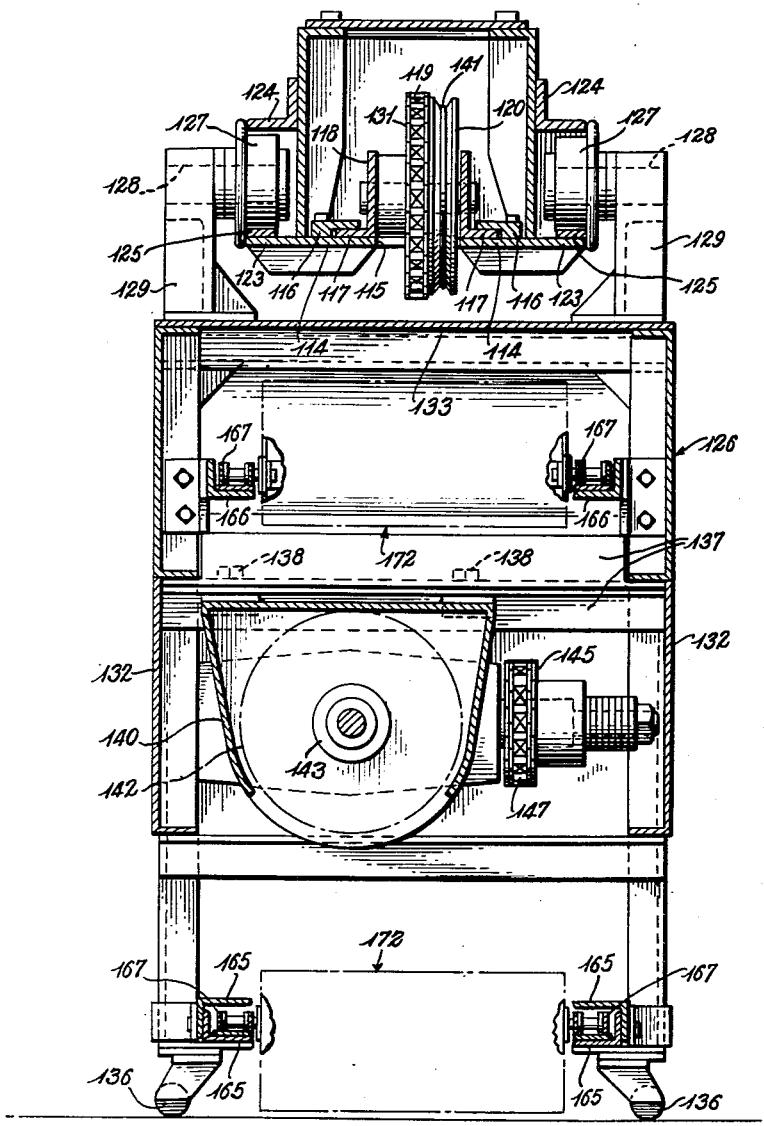

April 16, 1957   W. E. ERICKSON   2,788,904
BOXCAR UNLOADERS
Filed May 28, 1954   17 Sheets-Sheet 9
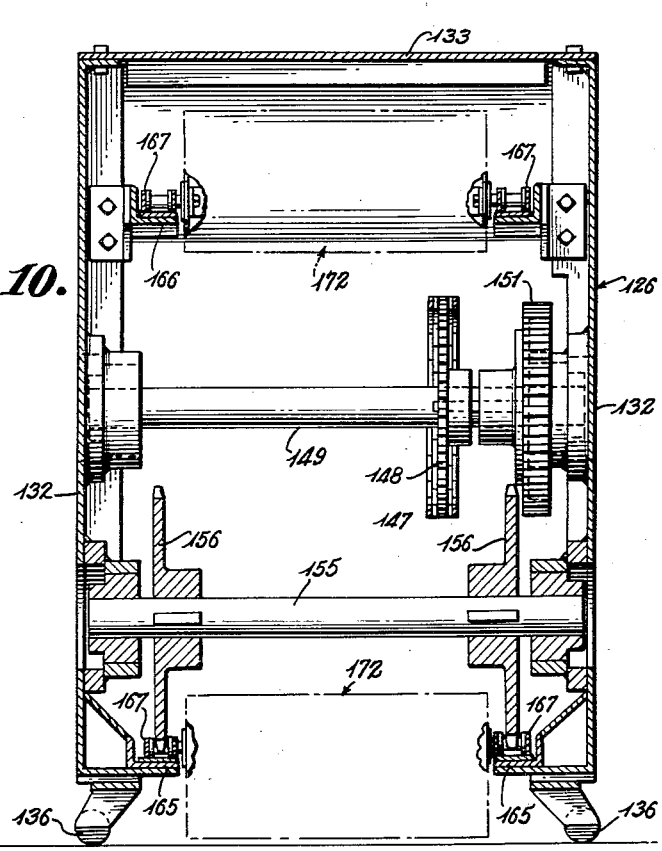
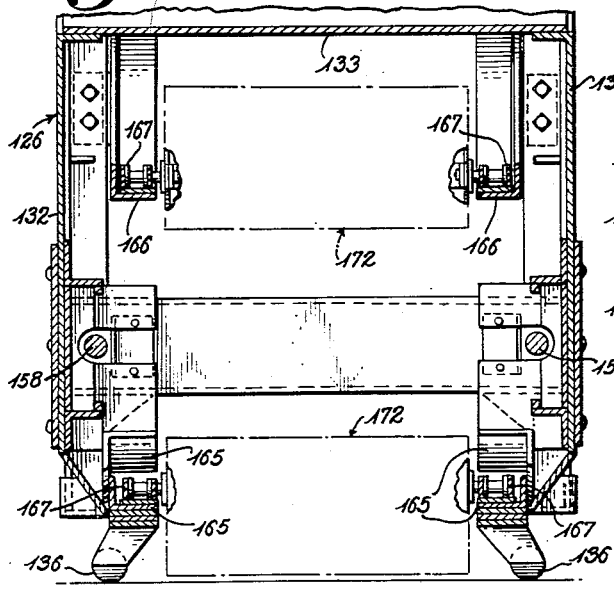
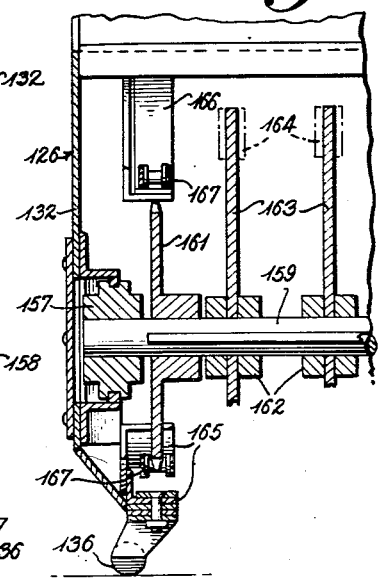

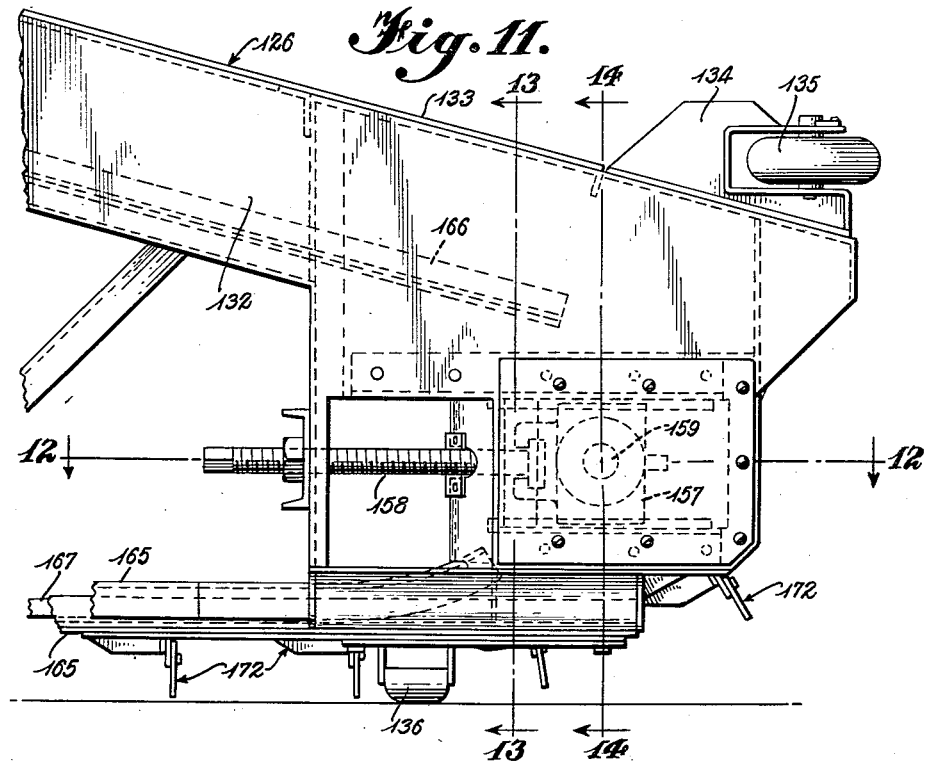
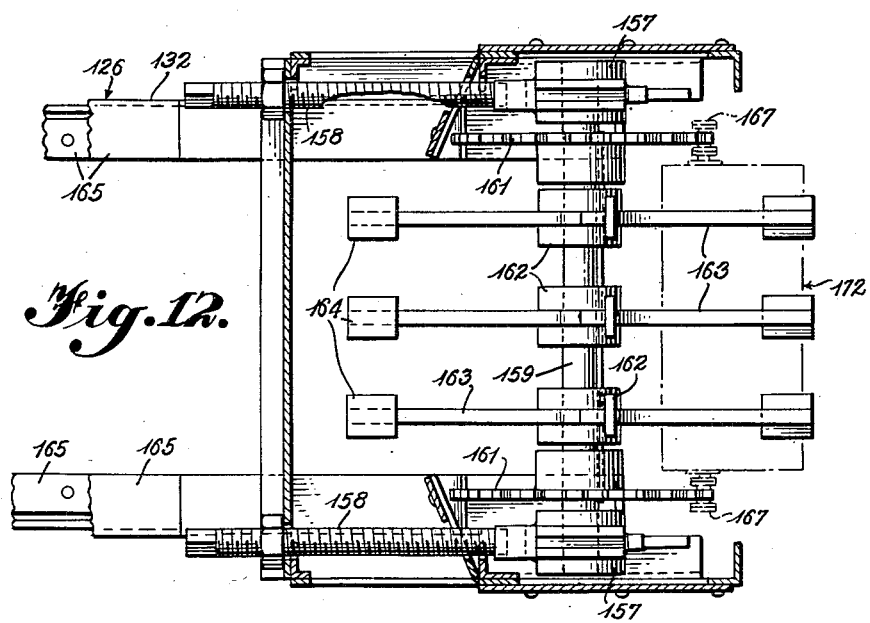

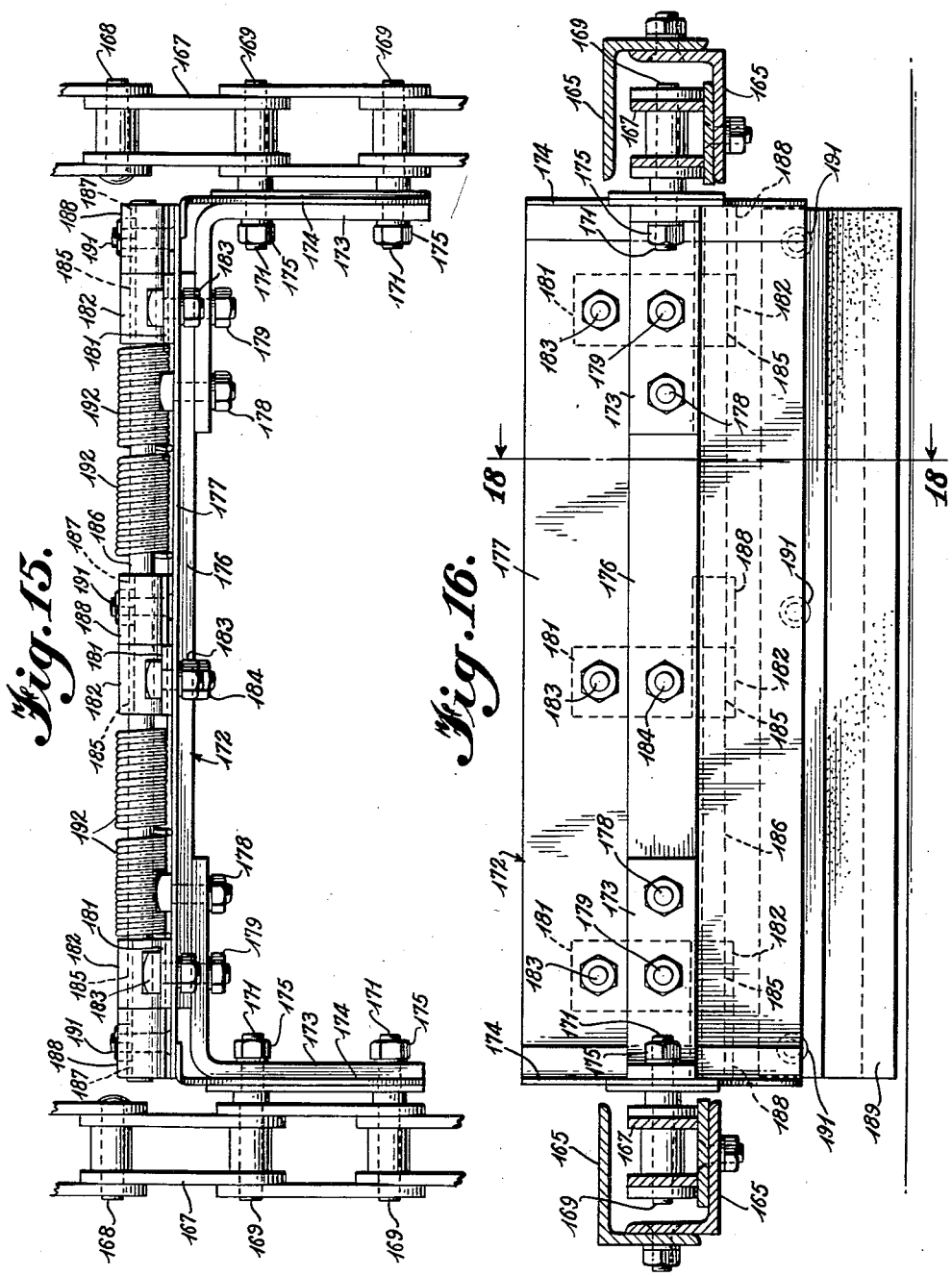

April 16, 1957 W. E. ERICKSON 2,788,904
BOXCAR UNLOADERS
Filed May 28, 1954 17 Sheets-Sheet 12
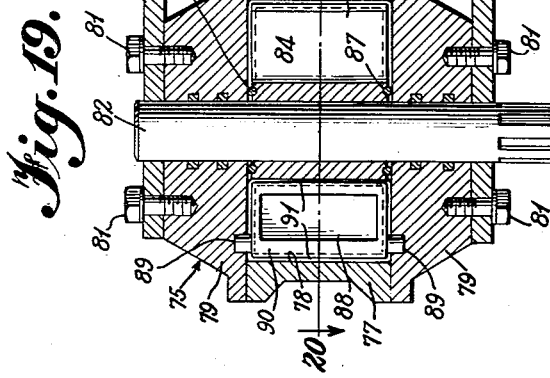
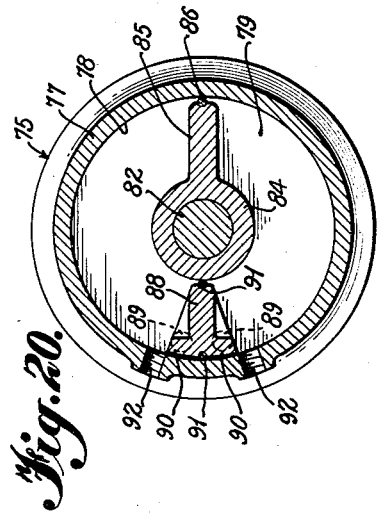
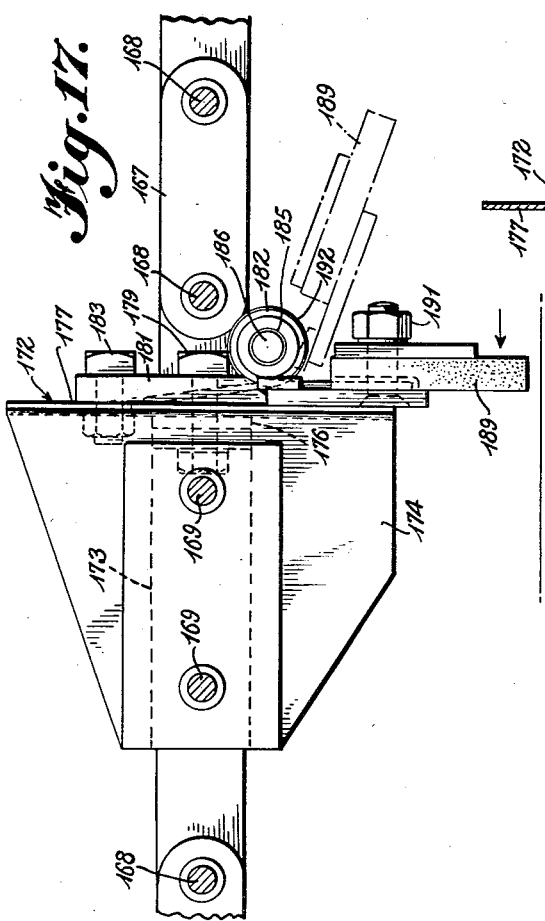
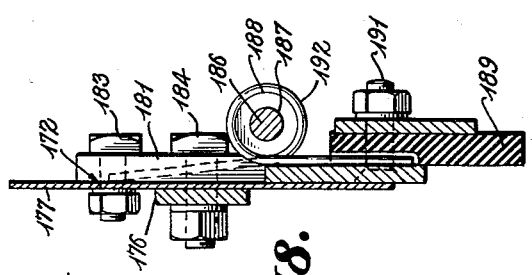

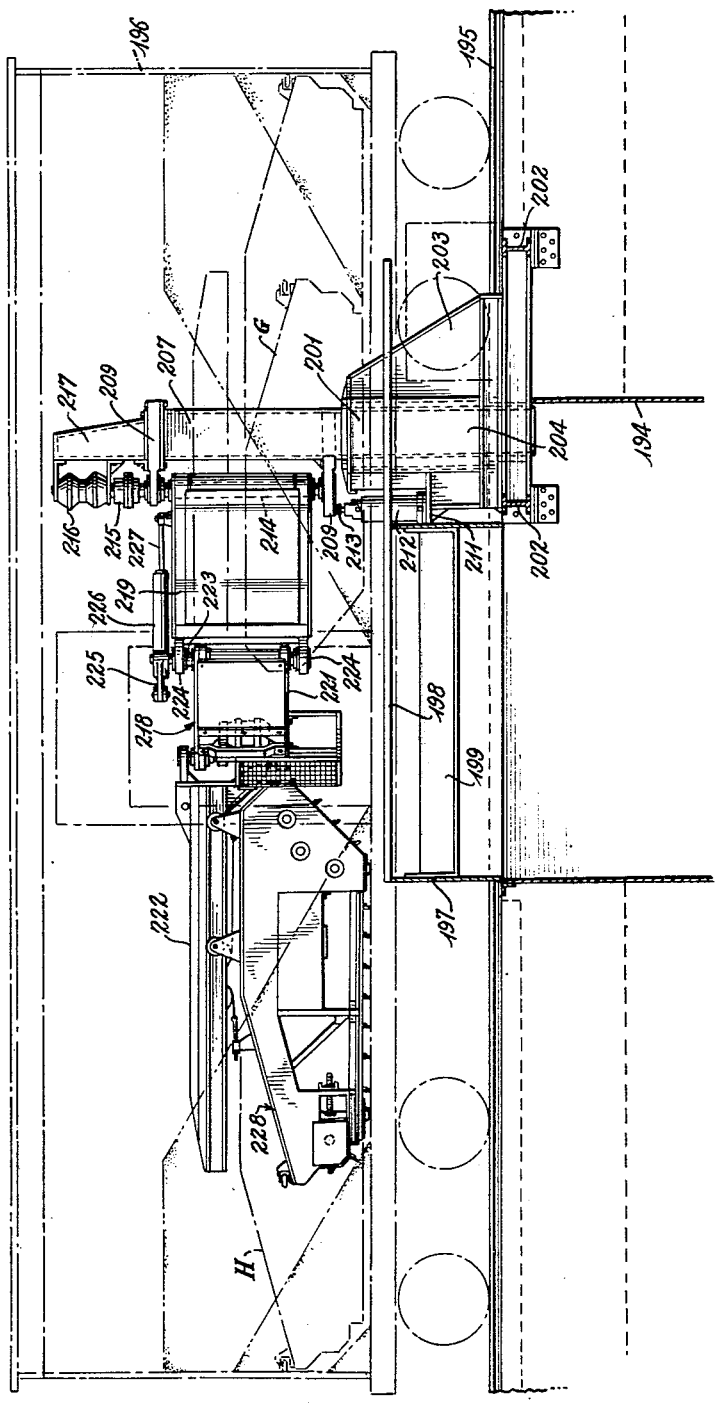

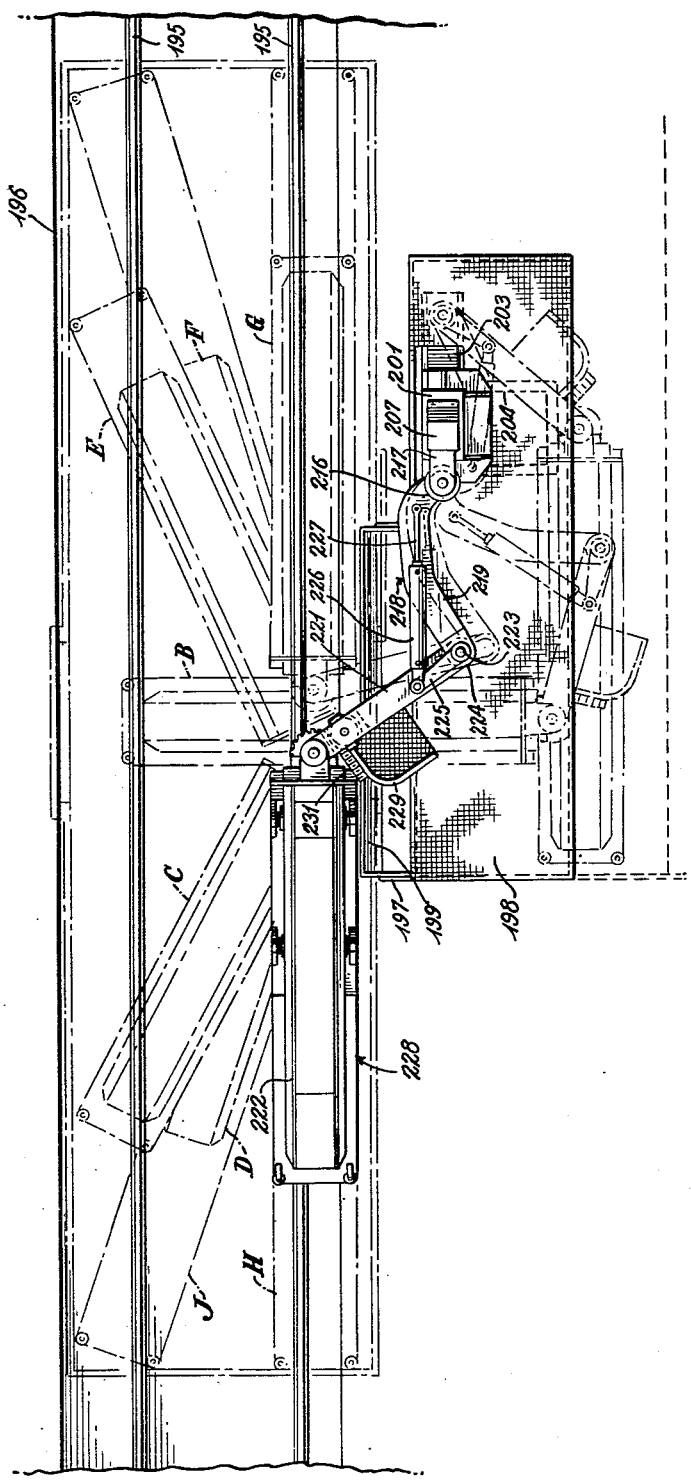

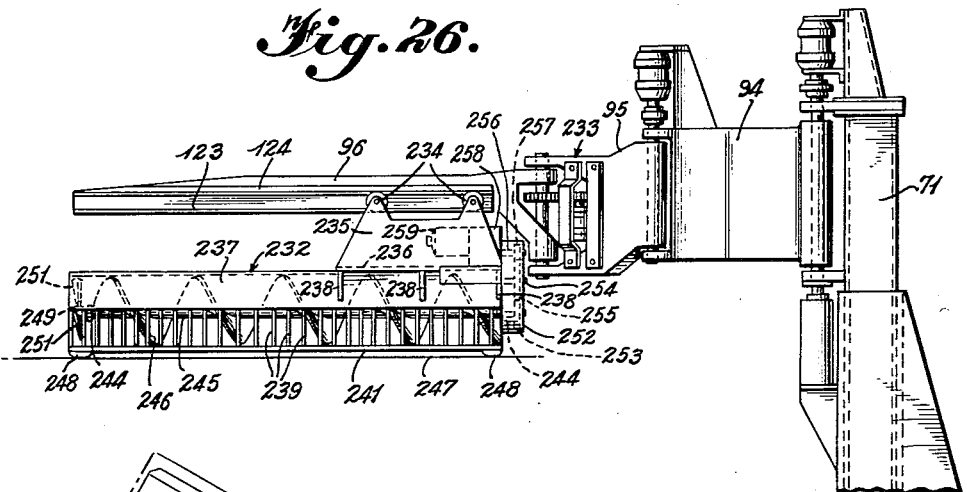
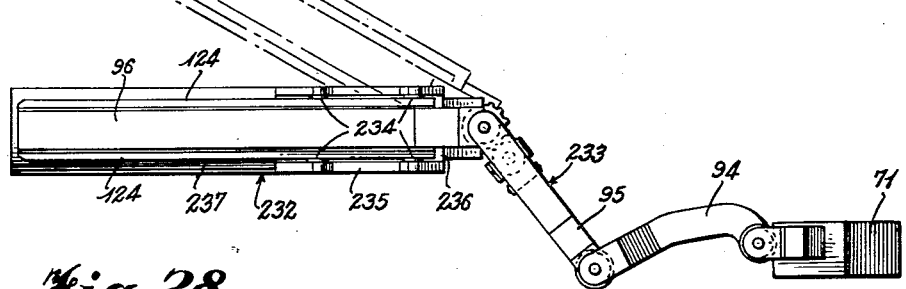
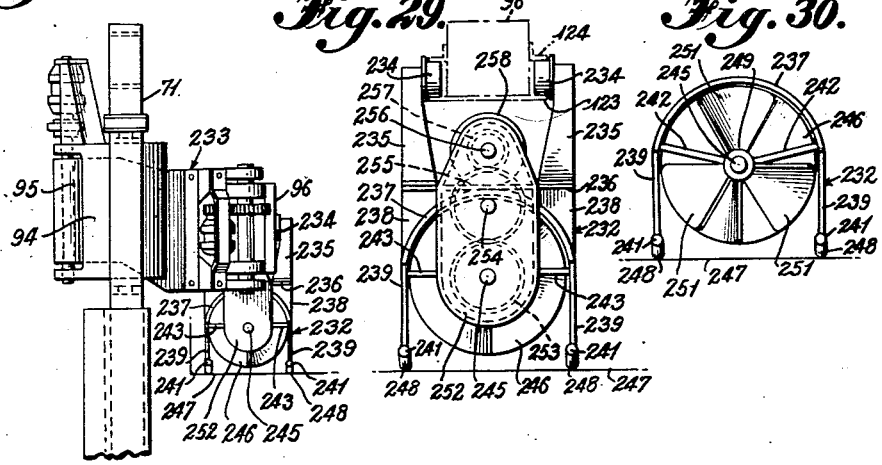

United States Patent Office 2,788,904
Patented Apr. 16, 1957

2,788,904

BOXCAR UNLOADERS

Willard E. Erickson, Chicago, Ill., assignor to Link-Belt Company, a corporation of Illinois Application May 28, 1954, Serial No. 433,205

20 Claims. (Cl. 214—52)

This invention relates to new and useful improvements in box car unloaders and deals more particularly with equipment for removing grain and various other free flowing bulk materials through the side doors of such railway cars.

It is at present common commercial practice to unload box cars containing grain and various other free flowing bulk materials, at storage elevators or other places of use, by either of two methods which differ very materially in so far as speed of operation and cost of initial installation are concerned.

One of these methods involves the use of a cable and winding drum actuated shovel scoop which must be manually manipulated and controlled by an operator working in the car during all material conveying and inactive return movements of the shovel scoop. The equipment required for carrying out this method is comparatively inexpensive and is normally considered as being capable of emptying grain cars at the rate of one in approximately one hour and twenty minutes. Where needed, the speed of operation of this method may be increased to the rate of approximately one car is forty minutes by doubling the number of operators and the amount and cost of the equipment used for each unloading operation.

The second of these methods involves the use of an endwise tiltable main frame and a car supporting platform mounted on the main frame for sidewise tipping movement relative to said frame. Each car is unloaded by spilling the material through an open side door by the combined effect of tipping the car sidewise and then tilting it endwise first in one direction and then in the other. The installation required for carrying out this method is extremely expensive as compared with the cost of the equipment for performing the first mentioned method and only can be justified for large daily capacity operations. This type of installation is normally rated as being capable of emptying approximately eight to ten grain cars per hours.

From the above descriptions of the two box car unloading methods now in common use, it will be appreciated that there exists a very sizeable field or area between them with reference to both the initial cost of equipment and their speeds of operation. There has been a long-felt need for some form of economical and efficient equipment that will fit into this area.

It is the primary object of this invention to provide, in its basic form, a conveyor type of railway box car unloading unit which may be readily and permanently installed at the existing receiving dock of a storage elevator, or other type of installation, to which bulk material is delivered by rail, and which may be manipulated and controlled by a single operator, positioned at a control station located exteriorly of the car, so as to effect the complete unloading operation.

It is a further important object of the invention to provide a railway box car unloading installation which cooperatively combines with the above referred to basic conveyor type unit additional mechanism for tipping the car sidewise to assist the conveyor unit in emptying the bulk material from the car.

Experimental tests have clearly indicated that the single operator, located exteriorly of the car, will be able to unload grain, or other free flowing bulk material, from railway box cars at a rate of two per hour when employing only the above referred to basic conveyor unit, and at a rate of four to five per hour when the mechanism for tipping or tilting the car sidewise is combined with the basic conveyor unit.

Another object of the invention is the provision of a box car unloading conveyor unit which may be permanently mounted on the stationary platform or base of a conventional bulk material receiving dock, or on the movable cradle of a special car tipping mechanism which may be installed at such a dock.

A further object of the invention is to effect rapid and economical unloading of bulk material through the open doorway of a railway box car by the combined action of mechanically conveying material from both end portions of the car and tilting the car sidewise to effect both spillage of material through the open doorway and concentration of the final portion of the material in the V-shaped trough that is naturally provided by the lower side wall and floor of the tilted car.

Still another object of the invention is the provision of a railway box car unloading flight type conveyor unit which is mounted exteriorly of the car for swinging movements into and out of both end portions of the car, and which is supported for vertical, longitudinal and transverse movements relative to said car end portions.

Other objects and advantages of the invention will be apparent during the course of the following description.

In the accompanying drawings forming a part of this specification and in which like reference characters are employed to designate like parts throughout the same, Figure 1 is a side elevational view of a car unloading installation embodying the invention, Figure 2 is a top plan view of the installation illustrated in Fig. 1, Figure 3 is an end elevational view of the installation with the car tilting mechanism in its upright position, Figure 4 is a similar view to Fig. 3 but illustrating the mechanism in its laterally tilted position, Figure 5 is a longitudinal, vertical sectional view of the shuttle conveyor embodied in the installation of Fig. 1, Figure 6 is a top plan view, partly broken away, of the conveyor illustrated in Fig. 5, Figure 7 is a horizontal sectional view taken on line 7—7 of Fig. 5, Figure 8 is a vertical sectional view taken on line 8—8 of Fig. 5, Figure 9 is a vertical sectional view taken on line 9—9 of Fig. 5, Figure 10 is a vertical sectional view taken on line 10—10 of Fig. 5, Figure 11 is a fragmentary side elevational view of the outer end of the shuttle conveyor illustrated in Fig. 5, Figure 12 is a detail, horizontal sectional view taken on line 12—12 of Fig. 11, Figure 13 is a vertical sectional view taken on line 13—13 of Fig. 11, Figure 14 is a fragmentary vertical sectional view taken on line 14—14 of Fig. 11, Figure 15 is an enlarged top plan view of one of the conveyor flights.

Figure 16 is a front elevational view of the flight illustrated in Fig. 15,

Figure 17 is an end elevational view of the flight illustrated in Fig. 15,

Figure 18 is a vertical sectional view taken on line 18—18 of Fig. 16,

Figure 1:
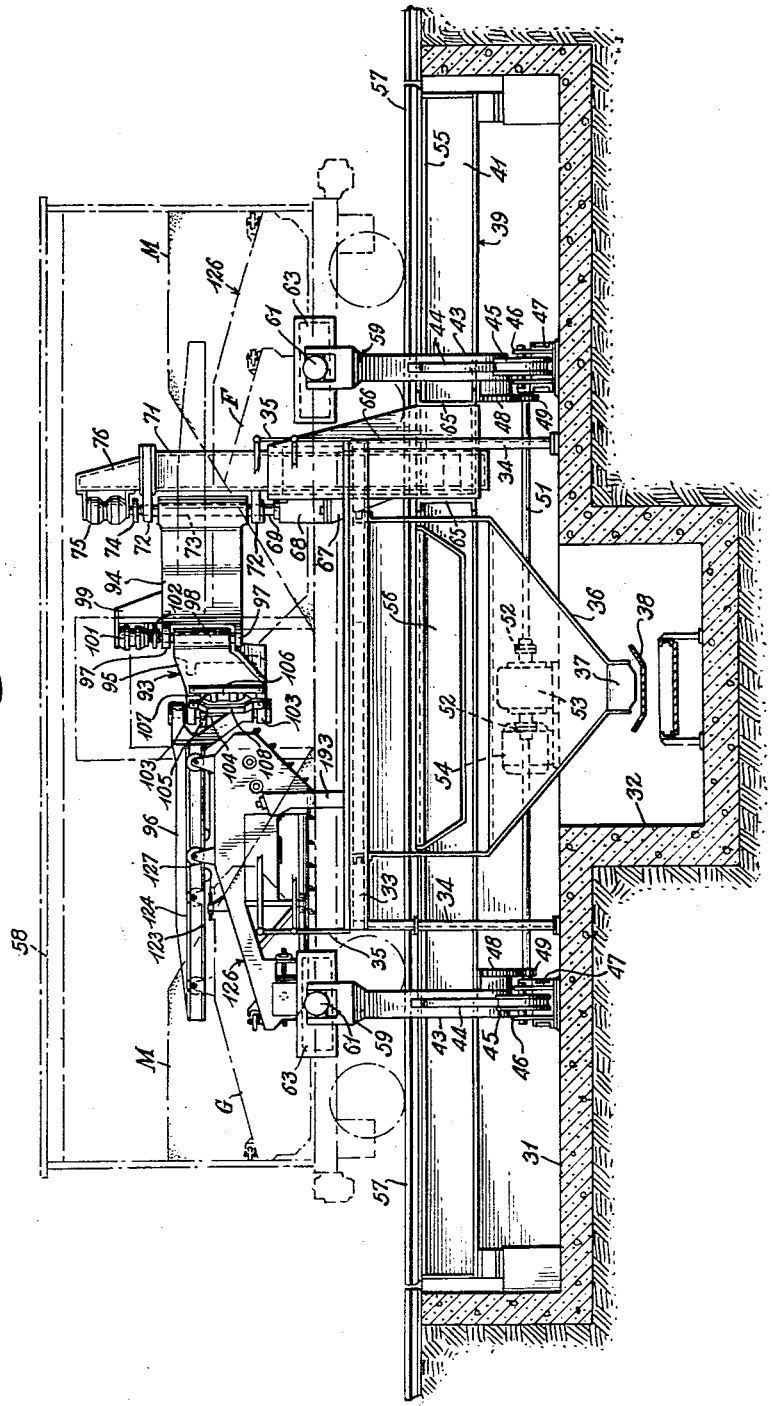
Figure 23:
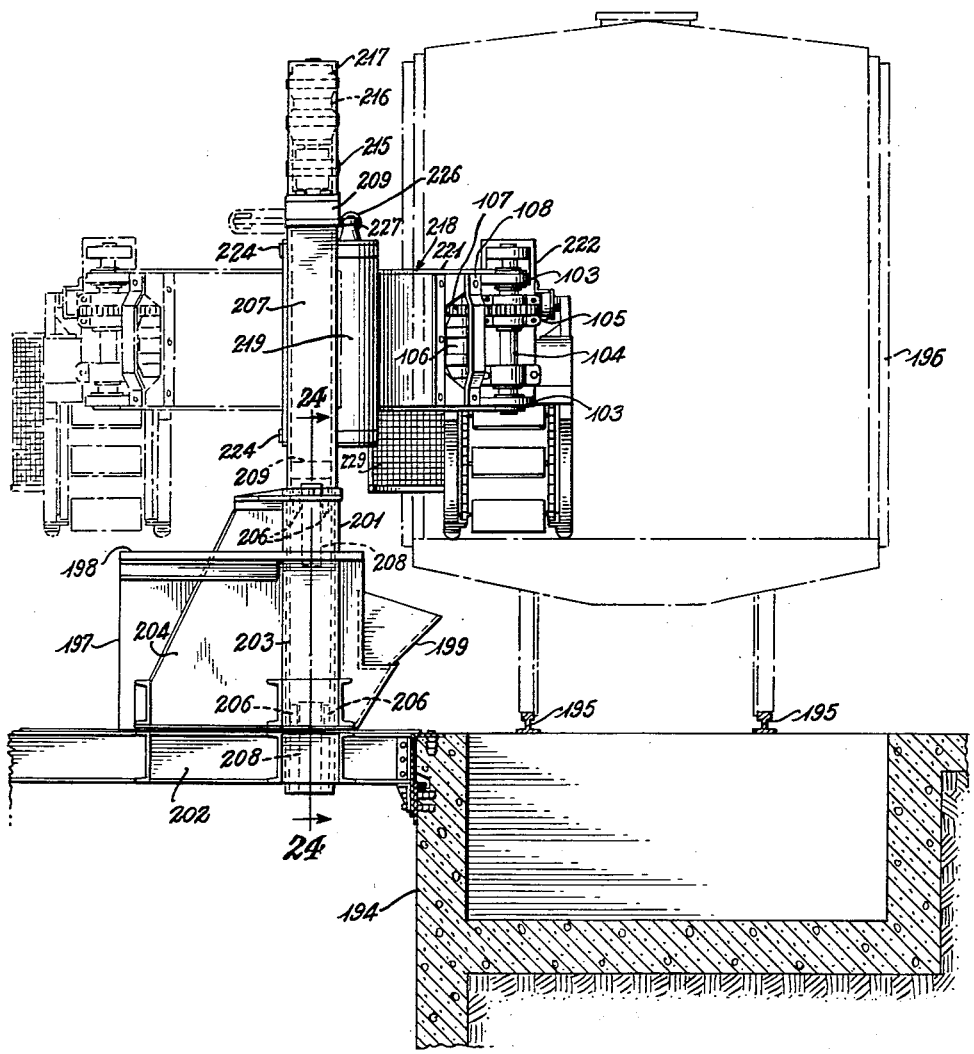
Figure 24:
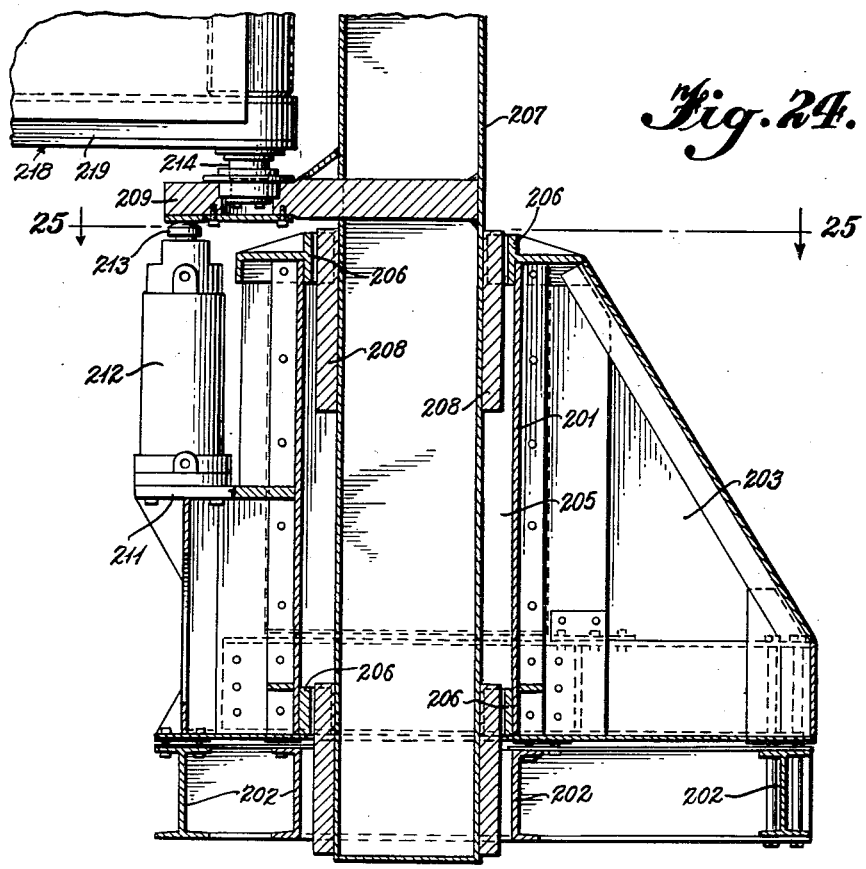
Figure 25:
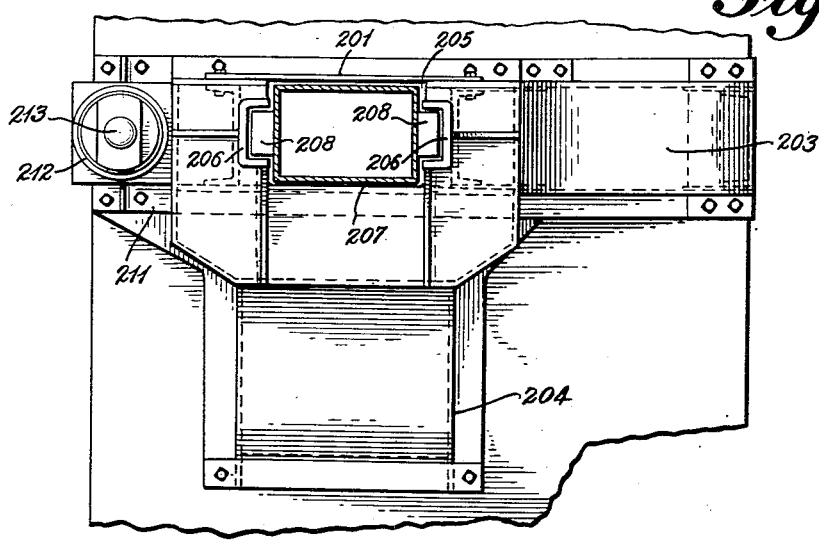

Figure 19 is a vertical sectional view of a rotary type hydraulic motor incorporated in the installation of Fig. 1, Figure 20 is a horizontal sectional view taken on line 20—20 of Fig. 19, Figure 21 is a side elevational view of a modified form of car unloading installation embodying the invention, Figure 22 is a top plan view of the installation illustrated in Fig. 21, Figure 23 is an end elevational view of the installation of Fig. 21, Figure 24 is a fragmentary vertical sectional view taken on line 24—24 of Fig. 23, Figure 25 is a horizontal sectional view taken on line 25—25 of Fig. 24, Figure 26 is a side elevational view of a modified form of shuttle conveyor which may be substituted for the conveyor of the installations illustrated in Figs. 1 and 21, Figure 27 is a top plan view of the conveyor illustrated in Fig. 26, Figure 28 is an end elevational view of the conveyor of Fig. 26, Figure 29 is an enlarged end elevational view of the inner end of the conveyor illustrated in Fig. 26, and Figure 30 is an enlarged end elevational view of the outer end of the conveyor illustrated in Fig. 26.

In the drawings, wherein for the purpose of illustration are shown the preferred embodiments of this invention, and first particularly referring to Figs. 1 to 4, inclusive, there is shown a railway box car unloading station including a track pit 31 and a conveyor pit 32 which extends laterally from the middle portion of the track pit. Mounted at one side of and above the top of the pit 31 is an operator's platform 33 which is formed of suitable grillwork to permit spilled material to fall therethrough. The platform 33 is supported by legs 34 and the outer side and ends have a guard rail 35 mounted thereon. Suspended from the bottom of the platform 33 is a hopper 36 having a bottom discharge opening 37 emptying into the conveyor pit 32. It will be noted in Fig. 3 that the inner end of the hopper 36 extends inwardly beyond the inner side of the platform 33. A conventional endless belt conveyor 38 is positioned in the conveyor pit 32 beneath the discharge opening 37 for carrying the material from the hopper to a point of storage or treatment.

Mounted in the track pit 31 beside the operator's platform 33 is a cradle 39 formed of longitudinally extending I-beams 41 that are connected in spaced relationship by webs 42. The cradle is supported by a pair of arcuate rockers 43 that are flanged along their peripheries to accommodate the tires 44 which are rigidly fastened to the rockers and rest upon laterally spaced flanged rollers 45. The rollers 45 are journaled in bearings 46 that are mounted on a suitable base 47 in the bottom of the pit 31. Movement of the tires 44 on the rollers 45, therefore, will effect lateral tilting or tipping of the cradle 39.

A drive for tilting the cradle 39 is provided by toothed segments 48 which are mounted on the flanged rockers 43 inwardly of the tires to mesh with the pinion gears 49 keyed to shafts 51 which are journaled on the base 47 and extend longitudinally of the pit 31. Near the middle of the pit 31, the shafts 51 are connected through flexible couplings 52 to a speed reducer 53 driven by a motor 54 to effect tilting of the cradle 39 and to return the cradle to its horizontal position. Any suitable brake mechanism is connected to the shaft of motor 54 to stop and hold the cradle 39 in any desired tipped position.

A cover plate 55 is mounted on the top flanges of the I-beams 41 and extends laterally therefrom to a position beneath the inner side of the platform 33 and into spaced relationship with the opposite side of the pit 31. A portion of the cover plate 55 is bent downwardly to provide a pouring spout 56 for assisting in directing material into the hopper 36.

Figure 2:
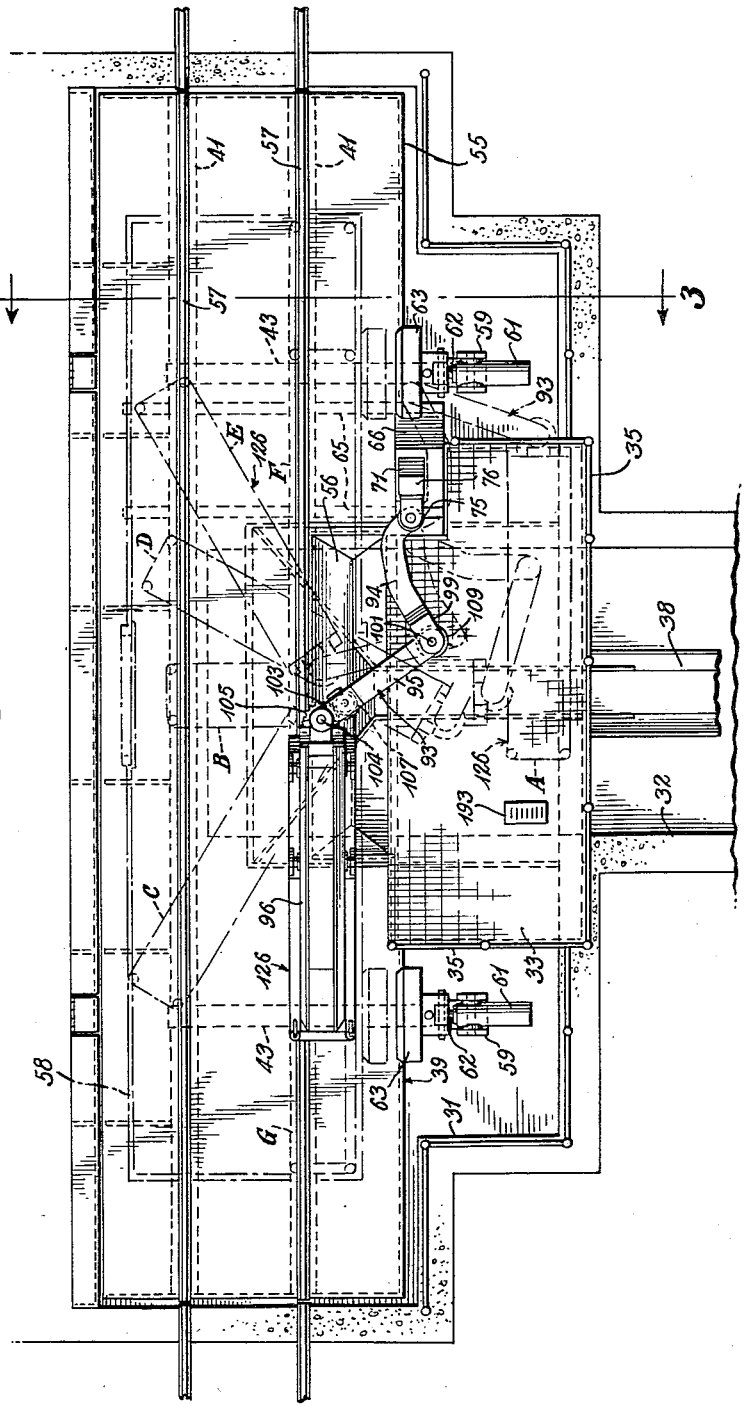

The spacing of the longitudinal beams 41 is equal to the standard railway gauge and rails 57 are mounted on the cover plate 55 immediately above the beams to provide a section of track extending longitudinally of the cradle 39. As illustrated in Figs. 1 and 2, the length of the cradle 39 is such that a railway box car 58, illustrated in broken lines, can be entirely supported for the desired sidewise tilting movement.

Each of the rockers 43 is extended in an arcuate direction to provide a supporting bracket 59 at the level of the car floor and spaced from the opposite ends of the operator's platform 33. Pivotally mounted on each supporting bracket 59 is a hydraulic cylinder 61 having an operating plunger 62 extending therefrom with a car engaging head 63 at its outer end portion. Each head 63 is connected to the associated rocker 43 by a link 64 so that extension of the operating plunger 62 will cause the head to be moved into engagement with the side of the car 58 at its floor level. Extension and retraction of the operating plunger 62 is effected by the admission and release of pressure fluid to and from the opposite ends of the cylinder 61 by conventional hydraulic connections, not shown.

Extending laterally from the side of the cradle 39 adjacent one end of the platform are a pair of laterally spaced transverse supporting beams 65 between which is mounted a guide post 66. This guide post is of box girder construction to provide a bore therethrough in normal relationship with the cradle 39 and of substantially rectangular cross-section.

A bracket 67 is provided on one side of the guide post 66 and has mounted thereon a hydraulic jack 68, or the like, having an operating plunger 69 which, in its lowered position, extends slightly above the level of the top of the guide post.

Mounted for axial movement in the bore of the guide post 66 is a mast 71 of rectangular cross-section. It will be noted that the mast 71 extends through the entire length of the bore of the guide post 66 so that movement of the mast will be limited to an axial direction. Extending from the side of the mast 71 towards the door of the car 58 are a pair of arms 72, the bottom one of which rests upon the top of the plunger 69 of the jack 68. Movement of the plunger 69, therefore, will cause the mast 71 to be raised and lowered and such movement of the plunger is effected by the admission or release of pressure fluid to and from the hydraulic jack 68 through a conventional type connection, not shown.

Journaled in and extending between the arms 72 is a shaft 73 the upper end portion of which is connected through a suitable coupling 74 to a rotary type hydraulic motor 75 which is mounted at the top of the mast 71 by a bracket 76.

Referring now to Figs. 19 and 20 for a detail description of the hydraulic motor 75, the body 77 is formed with a cylindrical bore 78 and caps 79 are suitably connected to the body to close the opposite ends of the bore 78. The end caps 79 are connected to the bracket 76 by cap screws 81 to prevent rotation of the motor. Extending axially through the end caps 79 and the bore 78 is a shaft 82 having an extended end portion provided with splines 83 for connection with the coupling 74. Suitably fastened to the shaft 82 within the bore 78 is a sleeve 84 having a radial vane 85 extending therefrom into closely spaced relationship with the cylindrical bore 78. A seal is provided between the outer edge of the vane 85 and the bore 78 and between the ends of the vane 85 and the end caps 79 by a suitable sealing member 86 and circular seal rings 87 are positioned between the ends of the sleeve 84 and the adjacent surfaces of the end caps 79.

A stationary radial partition 88 is located between the sleeve 84 and the bore 78 and is maintained in the desired position by lugs 89 that are seated in the end caps 79. Bosses 90 are provided on opposite sides of the partition 88 and extend along the bore 78 to limit movement of the vane 85 by engagement therewith. A seal member 91 extends entirely around the partition 88 in sealing engagement with the sleeve 84, bore 78 and end caps 79. On opposite sides of the partition 88 are ports 92 which are to be connected to pipe lines, not shown, for the simultaneous admission and release of pressure fluid to and from the interior of the body 77 on opposite sides of the vane 85 to cause the latter to move in one direction relative to the partition. By controlling the direction of flow of the fluid into and out of the body 77, the desired direction of movement of the vane 85 can be obtained. In this manner, the shaft 82 is rotated in either direction to rotate the shaft 73 through the coupling 74.

A conveyor supporting arm, designated in its entirety by the reference character 93, is connected at its inner end portion to the shaft 73 for movement therewith by operation of the motor 75. The arm 93 is formed with an inner end section 94, a middle section 95 and a free end section 96, the adjacent sections being pivotally connected to each other as will be later described. The inner end section 94 is laterally offset to permit pivotal movement of the same into a fully retracted position in which the mast 71 occupies the recess formed by the offset. The extent of outward, or projected, pivotal movement allowed the inner section 94 is limited by positioning the partition 88 of the motor 75 so that the vane 85 will engage one of the bosses 90 to prevent engagement between the inner section and the frame of the car door.

At its outer end portion, the inner section 94 is provided with upper and lower arms 97 and a shaft 98 extends vertically between and is journaled in said arms. A motor mounting bracket 99 is provided adjacent the upper arm 97 for receiving the hydraulic motor 101 that is connected through the flexible coupling 102 to the shaft 98 to effect pivotal movement of the latter. The motor 101 is constructed the same as the motor 75 and will not be described in detail.

Figure 5:
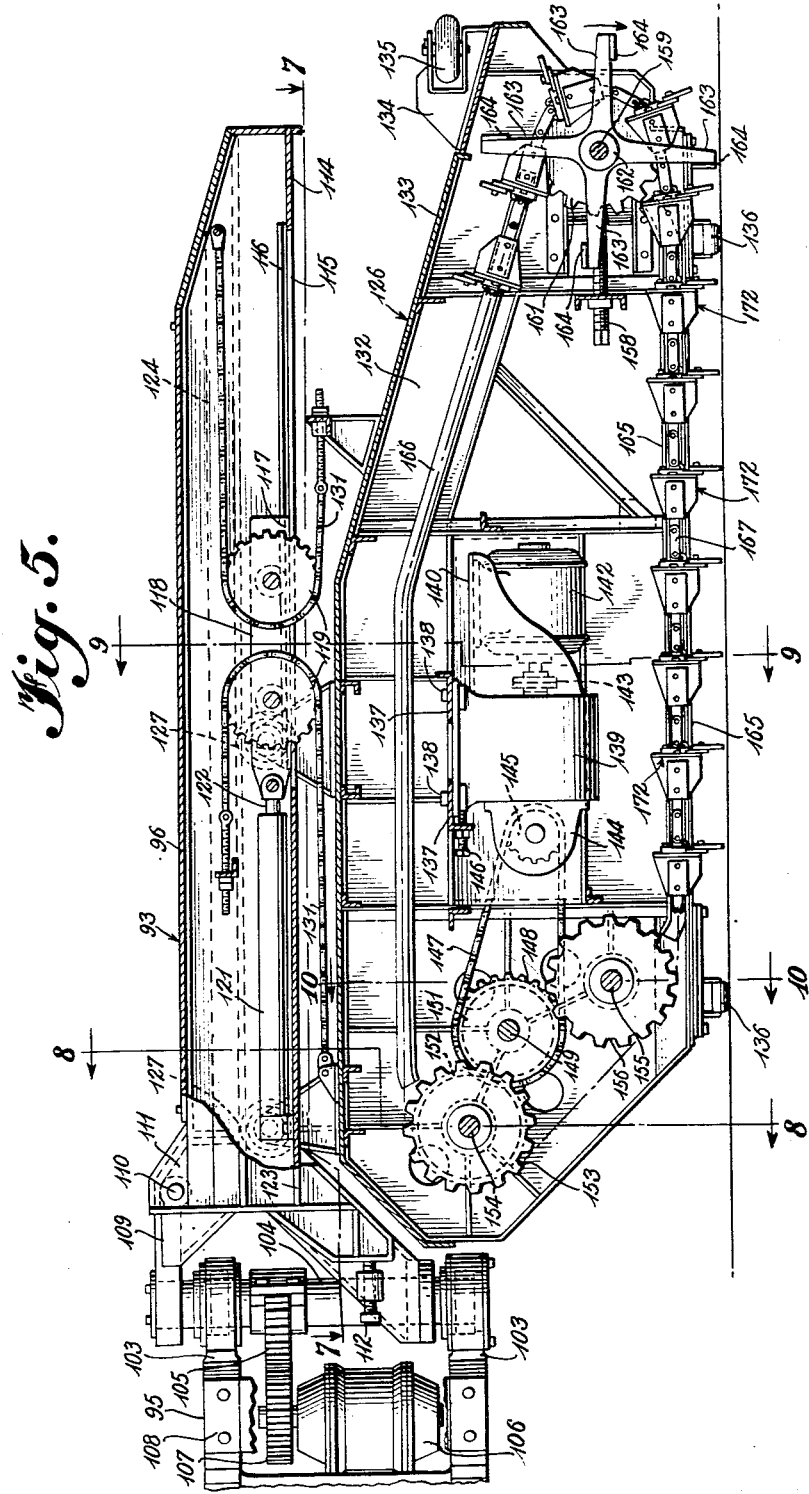
Figure 6:
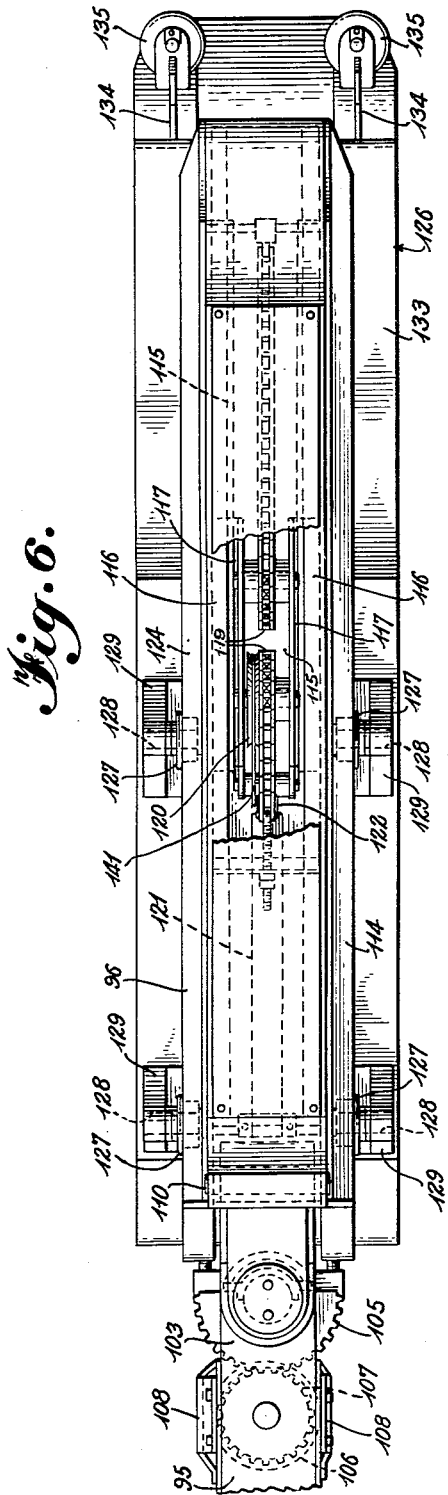

One end portion of the middle section 95 of the supporting arm 93 is rigidly connected to the shaft 98 for pivotal movement relative to the inner end section 94 by operation of the motor 101. The outer end of the middle section 95 is offset downwardly relative to its inner end portion and is provided with upper and lower arms 103. Extending between and journaled in the arms 103 is a shaft 104 having a toothed segment 105 rigidly connected thereto adjacent the upper arm. As is best illustrated in Figs. 5 and 6, a motor 106, of the same type as motors 101 and 75, is mounted between the arms 103 inwardly of the shaft 104 and is provided with a pinion 107 meshing with a toothed segment 105. Operation of the motor 106, therefore, will effect pivotal movement of the shaft 104. The motor 106 is mounted on members 108 which bridge the space between the arms 103 on each side of the middle section 95.

Figure 7:
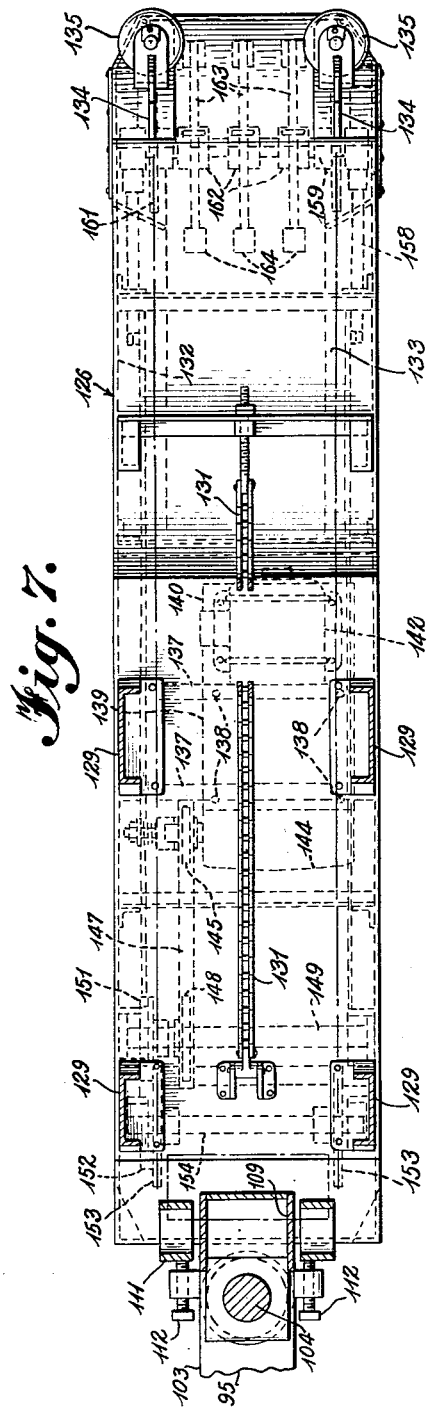

Referring now to Figs. 5, 6 and 7 for a detail description of the manner in which free end section 96 of the supporting arm 93 is mounted on the shaft 104 for pivotal movement therewith, the yoke 109 at the inner end of the free end section is provided with upper and lower arms rigidly connected to the shaft immediately above the arms 103. Pivotally connected to the upper portion of the yoke 109 by a pin 110 is a bracket 111 the lower portion of which bears against the adjusting studs 112 mounted on the lower portion of the yoke. It will be readily apparent, therefore, that adjustment of the studs 112 will cause pivotal movement of the bracket 111 about the pin 110 to raise and lower the outer end of the section 96 and to thereby permit leveling adjustment of the said free end section.

The free end section 96 is of box type construction as illustrated in Figs. 5, 8 and 9. Its bottom wall 114 is provided with a longitudinally extending, centrally located slot 115 in its outer end portion and guide brackets 116 are mounted on each side of the slot for receiving the laterally extending flanges 117 of the carriage 118. Two toothed sprockets 119 are mounted in longitudinally spaced relationship on the carriage 118 and the inner sprocket has mounted on one side thereof a sheave 120. The carriage 118 is movable longitudinally of the section 96 by a hydraulic cylinder 121 that is mounted in the inner end portion of said section and is connected to the carriage by its plunger 122. The plunger 122 is extended and retracted to move the carriage 118 inwardly and outwardly by the admission and release of fluid to and from the opposite ends of the hydraulic cylinder 121 in a conventional manner. The bottom portions of the toothed sprockets 119 extend downwardly through the slot 115 for a purpose that will be later described.

On opposite sides of the outer end section 96 a trackway is provided by the lateral extension 123 of the bottom wall 114 and by angle irons 124 which are mounted on the sides of said section and extend laterally therefrom in vertically spaced relationship with the extensions 123. The upper faces of the extensions 123 are provided with wear plates 125.

Suspended from the free end section 96 of the supporting arm 93 is a shuttle conveyor 126 which is suspended, as illustrated in Figs. 5, 8 and 9, by rollers 127 journaled on stub axles 128 carried by brackets 129 secured to the top and on opposite sides of the conveyor. The rollers 127 extend inwardly into the channels formed between the extensions 123 and angle members 124 and rest upon the wear plates 125.

Movement of the conveyor 126 is effected by the oppositely acting chains 131 that are anchored at their lower ends to the outer end portions of the top of the conveyor and extend longitudinally therealong to their respective adjacent sprockets 119. The chains 131 are wrapped around the sprockets 119 and are anchored at suitably spaced points to the free end section 96. Movement of the carriage 118, therefore, will cause simultaneous movement of the two chains 131 in opposite directions around their respective sprockets to move the conveyor a distance equal to twice the distance traveled by the carriage.

Referring now to Figs. 5 to 14, inclusive, for a detail description of the frame and drive arrangement for the conveyor 126, it will be noted that the frame is formed of two structurally reinforced side walls 132 connected at their tops by a cover plate 133 which is inclined downwardly at the outer end portion of the conveyor 126 and has mounted on opposite sides of the end of the conveyor a pair of roller brackets 134. Each bracket 134 is provided with a guide wheel 135 arranged to engage any vertical wall surface which the conveyor approaches from an angular direction so as to guide the conveyor as it is introduced into and positioned in the car 58. Supporting shoes 136 are mounted on the bottom of each side wall 132 at opposite end portions of the conveyor 126 for supporting the latter when it is lowered to the floor of the car 58 by a vertical adjustment of the supporting arm 93. Any other suitable supports such as rollers or casters may be substituted for the shoes 136 if desired.

Extending between and connected to the two side walls 132 near the center of the conveyor 126 are two flanged drive support members 137. Suspended from the members 137 by mounting bolts 138 is a speed reducer 139 which is provided with a motor mount 140 extending longitudinally from one side thereof. An electric motor 142 receives its supply of electrical energy through a cable 141 that is trained over the sheave 120 in a manner to prevent slack in the cable when the conveyor 126 is moved. The motor 142 is rigidly attached to the motor mount 140 and is coupled to the input shaft of the speed reducer 139 through a flexible coupling 143. The output shaft of the speed reducer 139 is provided with a right angularly arranged power take-off 144 for driving the sprocket 145 as illustrated in Figs. 5 and 9. The entire drive unit consisting of the speed reducer 139, a motor 142 and power take-off 144 is adjustable on the drive support members 137 by means of take-up screws 146 which are threaded through the vertical flange of one of the members 137 into engagement with the base of the speed reducer. After the unit is properly adjusted the mounting bolts 138 are tightened to fix the position of the drive unit.

Connected to the driving sprocket 145 by the chain 147 is a driven sprocket 148 that is keyed, or otherwise suitably connected, to a countershaft 149 journaled in the sides 132 of the conveyor. A drive gear 151 is keyed to the shaft 149 to mesh with and drive a gear 152 rigidly connected to a conveyor chain sprocket 153 that is keyed to one end portion of the shaft 154, journaled in and extending between the side walls 132 of the conveyor 126. A second sprocket 153 is keyed to the opposite end portion of the shaft 154 so that the two sprockets are spaced axially on the shaft and lie adjacent opposite sides 132 of the conveyor. Journaled in and extending between the side walls 132 of the conveyor 126 below and outwardly of the shaft 154 is a shaft 155 upon which is mounted a pair of conveyor chain sprockets 156 in radial alinement with the sprockets 153.

As best illustrated in Figs. 11 to 14, inclusive, the bearing blocks 157 are mounted on the opposite side walls 132 of the conveyor 126 at its outer end. The bearing blocks 157 are mounted for independent longitudinal movement relative to the side walls 132 by adjustment of the take-up screws 158 which are threadedly mounted on the conveyor frame and rotatably connected to the bearing blocks 157. A shaft 159 extends between and is rotatably supported by the blocks 157 and has keyed thereon a pair of conveyor chain sprockets 161 in radial alinement with the sprockets 153 and 156 which are at the inner end of the conveyor 126.

Spaced uniformly between the sprockets 161 and keyed to the shaft 159 are three spiders 162 having radial arms 163 with digging heads 164 mounted at their outer end portions. The spiders 162 are rotated by the shaft 159 and are adapted to loosen any packed or frozen material engaged by the digging heads 164.

Mounted along the bottoms and on the inner sides of the side walls 132 are the angular chain guides 165 providing an inwardly opening channel at each side of the conveyor. These guides 165 define the active or load carrying run of the conveyor chains and extend in a straight line between the lower peripheries of the sprockets 156 and 161. An angular chain support 166 is mounted on the inner side of each side wall 132 and extends between the upper peripheries of the sprockets 153 and 161 to support the inactive or return run of its conveyor chain. Trained over each radially alined set of sprockets 153, 156 and 161 is a conventional type conveyor chain 167 which has an active run positioned between its chain guide 165, a stacking run extending upwardly and inwardly from the sprocket 156 to the sprocket 153 and a return run resting upon its chain support 166 at the adjacent side of the conveyor.

As illustrated in Fig. 15, certain adjacent pitches of each chain 167 are connected by chain pins 169 providing laterally inwardly extending threaded projections 171. It will be noted that the projections 171 of both chains 167 are arranged in laterally alined relationship. Mounted on each of the opposed pairs of projections 171 is a material conveying flight designated in its entirety by the reference number 172.

Referring now to Figs. 15 to 18, inclusive, for a detail description of the flights 172, each pair of threaded projections 171 has mounted thereon an angle bracket 173 and a side plate 174 which are rigidly connected thereto by nuts 175. Extending between the inwardly directed portions of the angle brackets 173 and the flanged rear edges of the side plates 174 are a cross-brace 176 and a back plate 177. The cross-brace 176 and the back plate 177 are bolted to each other and to the angle brackets 173 by bolts 178 and 179. The lead 181 of a hinge member 182 at each side of the flight is bolted to the back plate 177 by one of the bolts 179 and by a bolt 183. The leaf 181 of the hinge member 182 at the center of the flight is connected to the back plate 177 by a bolt 184 which extends through the back plate and the cross-brace 176 and by one of the bolts 183. The hinge members 182 are provided with axially alined bores 185 for receiving the hinge pin 186 which also passes through the alined bores 187 in the hinge member 188.

The hinge member 188 extends entirely across the flight and is connected to a scraper blade 189 by bolts 191 to thereby pivotally support the blade along the bottom of the back plate 177 of the flight. The blade 189 is biased into a position paralleling the back plate 177 by springs 192 which are coiled around the hinge pin 186 and are provided with projecting end portions engaging the blade 189 and back plate 177.

It will be readily apparent that if a blade 189 encounters an immovable obstruction, such as a slat fastened to the floor of the car, the blade will be deflected, as illustrated by the broken line drawing of Fig. 17, to permit continued movement of the flight without damage thereto.

It will be noted in Fig. 5 that the digging spiders 162 on the shaft 159 at the outer end of the conveyor 126 are so arranged relative to the flights 172 that the radial arms 163 are spaced between adjacent flights and will not interfere with advancement of the chains 167 around their sprockets 161. It will also be noted that the side walls 132 of the conveyor 126 provide openings in their lower portions to permit material to flow laterally into the path of the flights 172 as they are moved through their active run between the sprockets 156 and 161.

The operation of the box car unloader illustrated in Figs. 1 to 20, inclusive, will be described as follows:

A car 58 containing grain or other bulk material M is moved along the rails 57 on the cradle 39 into a position at which one side door of the car is centered above the hopper 36. At this time, the supporting arm 93 and conveyor 126 will be positioned as indicated by the broken line drawing at A in Fig. 2. The door boards of the car 58 are then removed to permit a substantial portion the material in the car to spill out through the open door and fall into the hopper 36 for removal by the conveyor 38. The arm 93 is then moved by independent operation of the hydraulic motors 75, 101 and 106 to the position indicated by the broken line drawing at B in Fig. 2 with the arm being vertically adjusted by operation of the hydraulic jack 68 to locate the conveyor 126 in the upper portion of the car. From position B, independent pivotal movements of the various sections 94, 95 and 96 of the supporting arm 93 may be employed for moving the conveyor 126 into either end of the car 58 and into any of the positions indicated in broken lines at C, D, E and F of Fig. 2.

Assuming that the conveyor 126 is to be moved into the left-hand end of the car 58, as viewed in Fig. 2, with the arm properly elevated by the jack 68, its sections 94, 95 and 96 are pivoted relative to each other until the conveyor is finally positioned along the side wall of the car, as illustrated in full lines in Figs. 1 to 4, inclusive. During this insertion and proper positioning of the conveyor 126 in the car 58, the motor 142 will be operating to drive the conveyor chains 167 so that the material M encountered by the conveyor flights is moved toward the open door of the car and will spill therethrough into the hopper 36. While the conveyor is being positioned along the side wall of the car 58, the heads 63 on the cradle 39 are moved into engagement with the side of the car by operation of the hydraulic cylinders 61.

The operation of the jack 68, cylinders 61, hydraulic motors 75, 101 and 106 and the electric motor 142 may be controlled in a conventional manner at the control panel 193 on the operating platform 33, as illustrated in Figs. 1 and 2.

Figure 4:
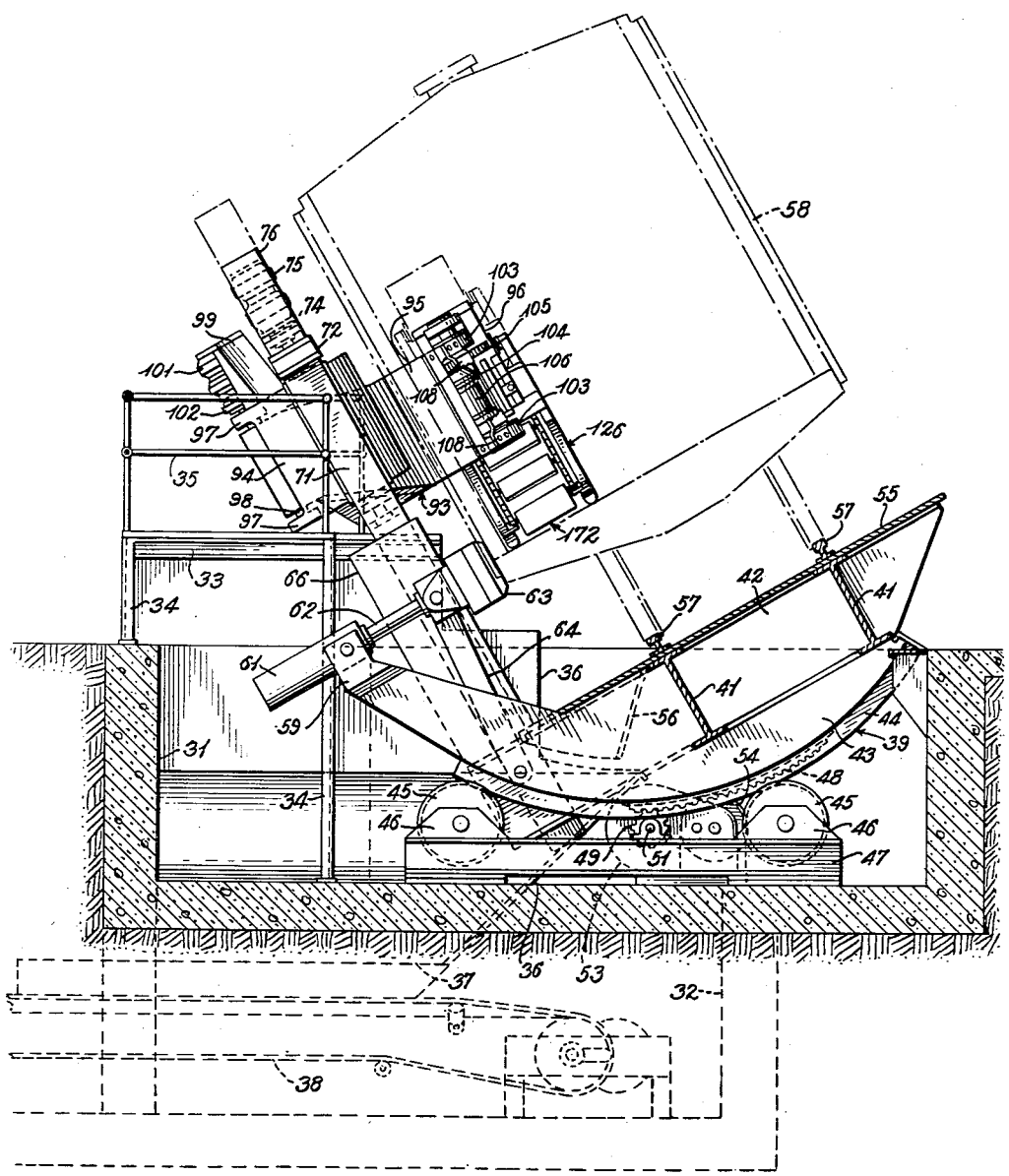

The cradle 39 with the car 58 resting thereon thereafter is tilted to the position illustrated in Fig. 4 by operation of the motor 54, through conventional controls at the control panel 193, to drive the pinions 49 which engage the toothed segments 48 on the cradle. This tilting of the car will cause the remainder of about 50% of the original content of the car to spill through the open doorway. The tilting also causes the bulk material remaining in the left-hand end portion of the car after such spillage to be concentrated in the V-shaped trough that is inherently provided by the lower side wall and floor of the tilted car, or around and beneath the elevated conveyor that is positioned adjacent said side wall.

The hydraulic jack 68 then is actuated to lower the conveyor into the position best illustrated in Fig. 4, or until the supporting shoes 136 engage the car floor. During this lowering movement of the operating conveyor, its flights continue to move the accessible material toward the open doorway of the car for discharge therethrough. When the material accessible to the lowered conveyor has been discharged, the conveyor 126 is advanced along the free end section 96 toward the adjacent end wall of the car, as illustrated in broken lines at G of Figs. 1 and 2, by operation of the hydraulic cylinder 121 through a conventional control at the central panel 193. The material M thus made accessible to the advancing conveyor will be moved toward the open door of the car and will initially accumulate at the discharge end of the conveyor. As material accumulates at the discharge end of the conveyor 126, the material that is carried to the discharge end will be elevated along the upwardly inclined stacking run of the conveyor and will run down the opposite side of the accumulated material along its own angle of repose toward the door of the car. The material accumulated at the discharge end of the conveyor then will be moved to the open door, for spillage therethrough, by retracting the conveyor along the free end section 96 until it reaches the full line position of Fig. 1.

The cradle 39 then is returned to its initial upright position and the conveyor 126 is moved to the broken line position B of Fig. 2 and elevated through actuation of the jack 68. The conveyor 126 then is moved through the positions D and E in the right-hand end of the car 58 and finally into a position F paralleling and adjacent its side wall of the car. The bulk material remaining in this end of the car 58 will be removed by again tilting the cradle and manipulating the conveyor in the manner described above with reference to the unloading of the left-hand end portion of the car. The car 58 is then righted by return of the cradle 39 to its initial position and the conveyor 126 is removed from the car so that the empty car can be moved off of the cradle and replaced by a loaded car.

It will be appreciated that the small amount of grain remaining in the car after the mechanical unloading operation has been completed may be quickly and easily removed manually if such cleaning is desired.

It will be noted that a single operator at the control panel 193 can carry out the complete unloading operation described above. Further, the independent angular adjustment of the various sections 94, 95, and 96 of the supporting arm 93 and the vertical adjustment of the mast 71 enable the operator to adapt the unloading equipment for operation with any of the various types of box cars 58 which may be used for delivering bulk material.

Referring now to Figs. 21 to 25, inclusive, for a detail description of the embodiment of the invention illustrated therein, a storage pit or hopper 194 is provided adjacent the rails 195 for receiving bulk material from the car 196 that is to be unloaded. The pit 194 is provided with a charging hopper 197 that is covered with grillwork 198 to permit material to spill therethrough into the pit. A spout 199 extends from the hopper to a position beneath the door of the properly positioned car 196. Adjacent one end of the charging hopper 197 is a supporting post 201 that is mounted on and supported by beams 202 extending laterally across the pit 194. Webs 203 and 204 extend longitudinally and laterally, respectively, from the post 201 to stabilize and strengthen the latter. The post 201 is of hollow construction to provide a vertical passageway 205 therethrough of substantially rectangular cross-section and guide shoes 206 are mounted near the top and bottom of the passageway.

A mast 207 is positioned with its lower end portion projecting downwardly through the passageway 205 and is provided with guide lugs 208 for cooperation with the guide shoes 206 to limit movement of the mast to only vertical directions. Projecting laterally from the mast 207 toward the open door of the car 196 are two arms 209 which are spaced vertically on the mast and the bottom one of which is positioned adjacent the top of the post 201. Mounted on the side of the post 201 beneath the lower arm 209 is a bracket 211 for supporting the hydraulic jack 212, the operating plunger 213 of which engages the lower arm 209 to support and effect movement of the mast 207. The plunger 213 of the jack 212 is raised and lowered by the admission and release of pressure fluid to and from the jack in a conventional manner to thereby raise and lower the mast 207 in the supporting post 201.

Journaled in and extending between the upper and lower arms 209 is a shaft 214, the upper end portion of which is connected through a flexible coupling 215 to a rotary type hydraulic motor 216 that is mounted on the top of the mast by a mounting bracket 217. The motor 216 is of the type illustrated in Figs. 19 and 20 and will not be described in detail.

Mounted on the shaft 214 for rotation therewith is a sectional supporting arm 218, the inner end portion of which is connected to the shaft. The arm 218 is formed with an inner end section 219, a middle section 221 and a free end section 222. Adjacent ends of the inner end section 219 and the middle section 221 are pivotally connected to each other by a shaft 223 that is rigidly connected to the middle section and is journaled in the arms 224 at the top and bottom of the inner end section. The upper end of the shaft 223 has mounted thereon a crank arm 225, the outer end of which is pivotally connected to the closed end of a hydraulic cylinder 226. A plunger 227 extends from the opposite end of the hydraulic cylinder and is connected at its outer end to the inner end section 219 adjacent the shaft 214. Extension and retraction of the plunger 227 by the admission and release of pressure fluid to and from the opposite ends of the cylinder 226 will cause the inner end section 219 and the middle section 221 of the supporting arm 218 to be pivoted relative to each other.

The middle section 221 and free end section 222 of the supporting arm 218 are pivotally connected to each other in the same manner as the sections 95 and 96 of the supporting arm 93 illustrated in Figs. 5, 6 and 7 and the drive mechanism for effecting relative pivotal movement between the two sections is also identical. This structure, therefore, will not be described again and corresponding reference characters will be applied to the corresponding structures of the two modifications.

The free end section 222 of the supporting arm 218 has suspended therefrom a conveyor 228 which is identical to the conveyor 126 of the first modification. Since the free end section 222 and conveyor 228 are identical to the corresponding structure of the previously described modification, this portion of the embodiment illustrated in Figs. 21 to 25, inclusive, will not again be described.

The operation of the box car unloader of Figs. 21 to 25, inclusive, will be described as follows:

The car 196 is positioned on the rails 195, as illustrated in Figs. 21 to 23, inclusive, and the door boards of the car are removed so that a substantial portion of the grain or other bulk material will spill through the open door into the charging hopper 197 of the pit 194. After the free flow of material from the car 196 has diminished, the conveyor is moved into the position illustrated in broken lines at B of Fig. 22 and the conveyor 228 is set into operation. It will be noted that the middle section 221 of the supporting arm 218 is provided with an operator's platform 229 having a control panel 231 by means of which vertical movement of the mast 207, relative pivotal movement between adjacent sections of the supporting arm 218 and operation of the conveyor drive may be centrally controlled in a conventional manner.

From the position illustrated at B in Fig. 22, the conveyor 228 may be moved into either end of the car 196, as illustrated by the broken lines at C, D, E, F and G of Fig. 22, and by the full line drawing of the conveyor in the car. Assuming that the conveyor 228 is to be moved into the left-hand end of the car 196, the conveyor will successively pass through positions B, C and D to the position shown in full lines, and during this movement of the conveyor, the material in that portion of the car traversed by movement of the conveyor will be transported to the door of the car for discharge into the receiving hopper 197. The material remaining in the end of the car will thereafter be removed by shuttling the conveyor 228 to its outermost position and sweeping the conveyor laterally across the end of the car, as illustrated in broken lines at H and J of Fig. 22, and by thereafter retracting the conveyor while the sweeping operation is continued. After the left end of the car 196 has been cleared of material, the conveyor is returned to the position B and thereafter inserted through positions E, F and G into the right-hand end of the car to remove the material therefrom in the manner described above.

As was pointed out in connection with the previously described modification of the invention, any small amounts of material remaining in the car after the above described unloading operation has been performed may be removed by hand, if desired, after the conveyor is withdrawn from the car.

Illustrated in Figs. 26 to 30, inclusive, is a screw flight type of shuttle conveyor 232 which is suspended from a supporting arm 233 that is identical to the supporting arm 93 of the modification of the invention illustrated in Figs. 1 to 20, inclusive. It will be appreciated, however, that the conveyor 232 is equally well adapted for mounting on a supporting arm of the type illustrated in Figs. 21 to 25, inclusive, so that the modified conveyor can be used in connection with either of the previously described embodiments of the invention. The support arm 233, being identical to the arm 93, the same reference characters have been applied to the corresponding parts of each and a detail description of the arm 233 will be omitted.

The conveyor 232 is suspended from the free end section 96 of the arm 233 by rollers 234 which are positioned between the laterally projecting rail members 123 and 124 on the opposite sides of the free end section. The rollers 234 are journaled on the brackets 235 which are connected to and extend upwardly from opposite sides of the drive base 236. This base is in turn connected to the top of the inverted trough 237 and to the web members 238 that are mounted between the drive base and the trough.

Extending tangentially downwardly from each side of the trough 237 are a plurality of spaced rods 239 which are connected at their bottom end portions by a bar 241 to provide a grillwork through which material can flow laterally into the space beneath the trough.

Mounted on radial arms 242 and 243 at the outer and inner ends, respectively, of the conveyor 232 are a pair of axially alined bearings 244 for rotatably mounting the screw shaft 245. Suitably attached to the shaft 245 is a screw flight 246, the rotation of which will cause the material engaged thereby to flow toward the inner end of the conveyor. The screw flight 246 is held in vertically spaced relationship with the floor 247 by supporting shoes 248 at the inner and outer ends of the conveyor 232.

The shaft 245 extends outwardly beyond the bearing 244 at the outer end of the conveyor 232 and has mounted thereon a digging propeller 249 having blades 251 for engaging and dislodging packed or frozen material.

At the inner end of the conveyor 232, the shaft 245 extends past the journal 244 into a gear housing 252 and has mounted thereon a gear 253 which may be actuated to effect rotation of the screw flight 246. Journaled in the gear housing 252, in spaced relationship with the shaft 245, is a countershaft 254 having a gear 255 mounted thereon for meshing with the gear 253. A drive shaft 256 projects into the upper portion of the housing and is provided with a drive gear 257 meshing with the gear 255. The drive shaft 256 is driven by a speed reducer 258 mounted on the drive base 236. Mounted on the reducer 258 is a motor 259 for driving the reducer and the meshed gears 257, 255 and 253 to impart rotation to the shaft 245 and screw flight 246.

The operation of the device illustrated in Figs. 26 to 30, inclusive, is identical to that of the device illustrated in Figs. 1 to 20, inclusive, and will not be described again.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. A device for unloading bulk material from a car through a doorway in one side wall thereof, comprising a supporting arm having a plurality of pivotally connected sections, means for mounting said supporting arm for movement about an axis normal to the car floor and adjacent said side wall of the car, separate means for effecting relative pivotal movement between each pair of connected arm sections to swing the free end portion of the arm into the interior of the car through said doorway, the section at the free end portion of said arm having a trackway thereon, an elongated frame, a plurality of rollers mounted on said frame for engaging said trackway to suspend the frame from the free end portion of the arm for movement longitudinally thereof, and conveying means carried entirely by said frame for moving material longitudinally of the latter when positioned in the car.

2. A device for unloading bulk material from a car through a doorway in one side wall thereof, comprising a supporting arm having a plurality of sections with adjacent sections connected for relative pivotal movement, means for mounting said supporting arm for movement about an axis normal to the car floor and adjacent said side wall of the car and for limited movement along said axis, separate means for effecting relative pivotal movement between said supporting arm and its mounting means and between each pair of connected arm sections to swing the free end portion of the arm into the interior of the car through said doorway, the section at the free end portion of said arm having a trackway thereon, an elongated frame, a plurality of rollers mounted on said frame for engaging said trackway to suspend the frame from the free end portion of the arm, means for moving said frame along said free end portion of the arm into and out of an extended position at which the frame projects outwardly beyond the free end of the arm, and conveying means carried entirely by said frame for moving material longitudinally of the latter when positioned in the car.

3. A device for unloading bulk material from a car through a doorway in one side wall thereof, comprising a supporting arm having a plurality of pivotally connected sections, means for mounting said supporting arm for movement about an axis normal to the floor of the car and adjacent said side wall of the car, separate means for effecting relative pivotal movement between each pair of connected arm sections to swing the free end portion of the arm into the interior of the car through said doorway, an elongated frame, means for suspending the elongated frame from the free end portion of the arm for movement longitudinally thereof into and out of an extended position at which the frame projects outwardly beyond the free end of the arm, means for raising and lowering said frame, means mounted on the bottom portion of said frame for supporting the latter on the floor of the car, and a conveyor carried entirely by and partially encased within said frame for engaging and moving only the material adjacent the bottom of the frame longitudinally of the latter when positioned in the car.

4. A device for unloading bulk material from a car through a doorway in one side wall thereof, comprising a mast mounted in normal relationship with the floor of the car and adjacent said side wall of the car, a supporting arm mounted on said mast for pivotal movement relative thereto and having a plurality of pivotally connected sections, separate means for effecting relative pivotal movement between each pair of connected arm sections to swing the free end portion of the arm into the interior of the car through said doorway, an elongated frame having an enclosed upper portion and an open bottom portion, means for suspending the elongated frame from the free end portion of the arm for movement longitudinally thereof, means for raising and lowering said frame, and conveying means carried entirely by said frame and partially housed within the enclosed upper portion thereof for engaging and moving only the material adjacent the bottom portion of the frame longitudinally of the latter when positioned in the car.

5. A device for unloading bulk material from a car through a doorway in one side wall thereof, comprising a mast mounted in normal relationship with the floor of the car and adjacent said side wall of the car, a supporting arm mounted on said mast for pivotal movement relative thereto and having a plurality of pivotally connected sections, separate means for effecting relative pivotal movement between each pair of connected arm sections to swing the free end portion of the arm into the interior of the car through said doorway, the section at the free end portion of said arm having a trackway thereon, an elongated frame having an enclosed upper portion and an open bottom portion, a plurality of rollers mounted on said frame for engaging said trackway to suspend the frame from the free end portion of the arm for movement longitudinally thereof into and out of an extended position at which the frame projects outwardly beyond the free end of the arm, means for raising and lowering said frame, means mounted at the outer end portion of said frame for breaking up coalesced masses of the material in the car, and a conveyor mounted entirely on said frame and partially housed within the enclosed upper portion thereof for movement with the frame and for movement relative thereto to continuously move only the material adjacent the bottom portion of the frame longitudinally of the latter when positioned in the car.

6. A device for unloading bulk material from a car through a doorway in one side wall thereof, comprising a mast mounted in normal relationship with the floor of the car and adjacent said side wall of the car, a supporting arm mounted on said mast for pivotal movement relative thereto and having a plurality of pivotally connected sections, separately controlled prime movers for independently effecting pivotal movement of said arm on said mast and relative pivotal movement between each pair of connected arm sections to swing the free end portion of the arm into the interior of the car through said doorway, the section at the free end portion of said arm having a trackway thereon, an elongated frame having an enclosed upper portion and an open bottom portion, a plurality of rollers mounted on said frame for engaging said trackway to suspend the frame from the free end portion of the arm for movement longitudinally thereof into and out of an extended position at which the frame projects outwardly beyond the free end of the arm, means mounted at the outer end portion of said frame for breaking up coalesced masses of the material in the car, and a conveyor mounted entirely on said frame and partially housed within the enclosed upper portion thereof for movement therewith and for movement relative thereto to continuously move only the material adjacent the bottom portion of the frame longitudinally of the latter when positioned in the car.

7. A device for unloading bulk material from a car through a doorway in one side wall thereof, comprising a sidewise tiltable base onto which a car may be run, means for tilting said base, a supporting arm having a plurality of pivotally connected sections, means mounted on said base for supporting said arm for movement about an axis normal to the car floor and adjacent said one side wall of the car, separate means for effecting relative pivotal movement between each pair of connected arm sections to swing the free end portion of the arm into the interior of the car through said doorway, said free end portion being movable by actuation of said separate means into positions paralleling the lower side wall of said car in opposite directions from the doorway, an elongated frame having an enclosed upper portion and an open bottom portion, means for suspending the elongated frame from the free end portion of the arm for movement longitudinally thereof, and conveying means carried entirely by said frame and partially housed within the enclosed upper portion thereof for moving only the material adjacent the bottom portion of the frame longitudinally of the latter when positioned in the car.

8. A device for unloading bulk material from a car through a doorway in one side wall thereof, comprising a sidewise tiltable base onto which a car may be run, means for tilting said base, means mounted on said base for movement to engage and laterally support the car in its tilted position, a mast mounted on said base in fixed normal relationship with the car floor and adjacent said one side wall of the car, a supporting arm mounted on said mast for pivotal movement only relative thereto and having a plurality of pivotally connected sections, separate means for effecting relative pivotal movement between each pair of connected arm sections to swing the free end portion of the arm into the interior of the car through said doorway, an elongated frame having an enclosed upper portion and an open bottom portion, means for suspending the elongated frame from the free end portion of the arm for movement longitudinally thereof, means for raising and lowering said frame, and conveying means carried entirely by said frame and partially housed within the enclosed upper portion thereof for moving only the material adjacent the bottom portion of the frame longitudinally of the latter when positioned in the car.

9. A device for unloading bulk material from a car through a doorway in one side wall thereof, comprising a supporting arm having a plurality of pivotally connected sections, means for mounting said supporting arm for movement about an axis normal to the car floor and adjacent said one side wall of the car, separate means for effecting relative pivotal movement between each pair of connected arm sections to swing the free end portion of the arm into the interior of the car through said doorway, an elongated frame, means for suspending the elongated frame from the free end portion of the arm for movement longitudinally thereof, and an endless series of material conveying flights mounted entirely on said frame for movement through a fixed path including an active run from the outer to the inner end portion of said frame adjacent the bottom thereof to move material longitudinally of the frame when positioned in the car.

10. A device for unloading bulk material from a car through a doorway in one side wall thereof, comprising a supporting arm having a plurality of sections with adjacent sections connected for relative pivotal movement, means for mounting said supporting arm for movement about an axis normal to the car floor and adjacent said one side wall of the car and for limited movement along said axis, separate means for effecting relative pivotal movement between said supporting arm and its mounting means and between each pair of connected arm sections to swing the free end portion of the arm into the interior of the car through said doorway, an elongated frame having an enclosed upper portion and an open bottom portion, means for suspending said frame from the free end portion of the arm, means for moving said frame along said free end portion of the arm, a plurality of endless chains supported entirely on said frame for movement through fixed paths including active runs from the outer to the inner end portion of the frame along the bottom portion thereof and through return runs within the enclosed upper portion of the frame, and a plurality of material conveying flights extending transversely between and connected at uniformly spaced intervals to said chains for movement thereby to move only the material adjacent the open bottom portion of the frame longitudinally of the latter when positioned in the car.

11. A device for unloading bulk material from a car through a doorway in one side wall thereof, comprising a sidewise tiltable base onto which a car may be run, means for tilting said base, a supporting arm having a plurality of pivotally connected sections, means mounted on said base for supporting said arm for movement about an axis normal to the car floor and adjacent said one side wall of the car, separate means for effecting relative pivotal movement between each pair of connected arm sections to swing the free end portion of the arm into the interior of the car, through said doorway, said free end portion of the arm being movable by actuation of said separate means into positions paralleling the lower side wall of the car in opposite directions from the doorway, an elongated frame, means for suspending said frame from the free end portion of the arm for movement longitudinally thereof, and an endless series of material conveying flights mounted entirely on said frame for movement through a fixed path including an active run from the outer to the inner end portion of said frame adjacent the bottom thereof to move material longitudinally of the frame when positioned in the car and an upwardly inclined stacking run at the inner end portion of said frame to elevate the material for gravitational flow along its own angle of repose toward the door of the car.

12. A device for unloading bulk material from a car through a doorway in one side wall thereof, comprising a supporting arm having a plurality of pivotally connected sections, means for mounting said supporting arm for movement about an axis normal to the car floor and adjacent said one side wall of the car, separate means for effecting relative pivotal movement between each pair of connected arm sections to swing the free end portion of the arm into the interior of the car through said doorway, an elongated frame, means for suspending said frame from the free end portion of the arm for movement longitudinally thereof, a rotatable shaft mounted longitudinally of said frame, a helical material conveying flight mounted on said shaft, and means for rotating said shaft to cause said flight to move material longitudinally of the frame when positioned in the car.

13. A device for unloading bulk material from a car through a doorway in one side wall thereof, comprising a supporting arm having a plurality of sections with adjacent sections connected for relative pivotal movement, means for mounting said supporting arm for movement about an axis normal to the car floor and adjacent said one side wall of the car and for limited movement along said axis, separate means for effecting relative pivotal movement between said supporting arm and its mounting means and between each pair of connected arm sections to swing the free end portion of the arm into the interior of the car through said doorway, an elongated frame, means for suspending said frame from the free end portion of the arm, means for moving said frame along said free end portion of the arm, a rotatable shaft mounted longitudinally of said frame, a material conveying flight mounted on said shaft, means for rotating said shaft to cause said flight to move material longitudinally of the frame when positioned in the car, and a breaker blade mounted on the outer end portion of said shaft for breaking up coalesced masses of material in the car.

14. A device for unloading bulk material from a car through a doorway in one side wall thereof, comprising a sidewise tiltable base onto which a car may be run, means for tilting said base, a supporting arm having a plurality of pivotally connected sections, means mounted on said base for supporting said arm for movement about an axis normal to the car floor and adjacent said one side wall of the car, separate means for effecting relative pivotal movement between each pair of connected arm sections to swing the free end portion of the arm into the interior of the car through said doorway, said free end portion being movable by actuation of said separate means into positions paralleling the lower side wall of the car in opposite directions from the doorway, an elongated frame, means for suspending said frame from the free end portion of the arm for movement longitudinally thereof, a rotatable shaft mounted longitudinally of said frame, a helical material conveying flight mounted on said shaft, and means for rotating said shaft to cause said flight to move material longitudinally of the frame when positioned in the car.

15. A device for unloading bulk material from a car through a doorway in one side wall thereof, comprising a mast mounted on a stationary base for vertical movement only adjacent said one side wall of the car, a supporting arm mounted on said mast for pivotal movement relative thereto about a vertical axis and having a plurality of pivotally connected sections, separate means for effecting relative pivotal movement between each pair of connected arm sections about vertical axes to swing the free end portion of the arm into the interior of the car through said doorway, the section at the free end portion of said arm having a trackway thereon, and elongated frame, a plurality of rollers mounted on said frame for engaging said trackway to suspend said frame from the free end portion of the arm for horizontal movement longitudinally thereof, and conveying means carried entirely by said frame for moving material longitudinally of the frame when poistioned in the car.

16. A device for unloading bulk material from a car through a doorway in one side wall thereof, comprising a stationary guide adjacent said one side wall of the car, a mast mounted for vertical movement only in said guide, a supporting arm mounted on said mast for pivotal movement relative thereto about a vertical axis and for vertical movement with the mast, said supporting arm having a plurality of pivotally connected sections, separate means for effecting relative pivotal movement between each pair of connected arm sections to swing the free end portion of the arm into the interior of the car through said doorway, the section at the free end portion of said arm having a trackway thereon, means for raising and lowering said mast in said guide to adjust the height of said supporting arm, an elongated frame, a plurality of rollers mounted on said frame for engaging said trackway to suspend said frame from the free end portion of the arm for horizontal movement longitudinally thereof, said frame being vertically movable by vertical movement of said mast, and conveying means carried entirely by said frame for moving material longitudinally of the frame when positioned in the car.

17. A device for unloading bulk material from a car through a doorway in one side wall thereof, comprising a mast mounted for vertical movement only adjacent said one side wall of the car, a supporting arm mounted on said mast for pivotal movement relative thereto about a vertical axis and having a plurality of pivotally connected sections, separate means for effecting relative pivotal movement between each pair of connected arm sections about vertical axes to swing the free end portion of the arm into the interior of the car through said doorway, an elongated frame, means for suspending said frame from the free end portion of the arm for horizontal movement longitudinally thereof, supporting means mounted on the bottom portion of said frame for movement into supporting engagement with the floor of the car by vertical movement of said mast, and an endless series of material conveying flights mounted on said frame for movement through a fixed path including an active run from the outer to the inner end portion of said frame along the bottom portion thereof to move material longitudinally of the latter when positioned in the car.

18. A device for unloading bulk material from a car through a doorway in one side wall thereof, comprising a stationary guide adjacent said one side wall of the car, a mast mounted for vertical movement only in said guide, a supporting arm mounted on said mast for pivotal movement relative thereto about a vertical axis and for vertical movement with the mast, said supporting arm having a plurality of pivotally connected sections, separate means for effecting relative pivotal movement between each pair of connected arm sections to swing the free end portion of the arm into the interior of the car through said doorway, means for raising and lowering said mast in said guide to adjust the height of said supporting arm, an elongated frame, means for suspending said frame from the free end portion of the arm for horizontal movement longitudinally thereof, said frame being vertically movable by vertical movement of said mast, a plurality of endless chains supported entirely on said frame for movement through fixed paths including active runs from the outer to the inner end portion of the frame adjacent the bottom thereof, and a plurality of material conveying flights extending transversely between and connected at uniformly spaced intervals to said chains for movement thereby to move material longitudinally of the frame when positioned in the car.

19. A device for unloading bulk material from a car through a doorway in one side wall thereof, comprising a stationary guide adjacent said one side wall of the car, a mast mounted for vertical movement only in said guide, a supporting arm mounted on said mast for pivotal movement relative thereto about a vertical axis and for vertical movement with the mast, said supporting arm having a plurality of pivotally connected sections, separate means for effecting relative pivotal movement between each pair of connected arm sections to swing the free end portion of the arm into the interior of the car through said doorway, means for raising and lowering said mast in said guide to adjust the height of said supporting arm, an elongated frame, means for suspending said frame from the free end portion of the arm for horizontal movement longitudinally thereof, said frame being vertically movable by vertical movement of said mast, a plurality of laterally opposed pairs of sprockets mounted on said frame adjacent opposite sides thereof for rotation about axes that are fixed relative to said frame, an endless chain trained over the sprockets at each side of said frame, means supporting said chains for movement through fixed paths including active runs from the outer to the inner end portion of the frame and upwardly and inwardly inclined stacking runs at the inner end portion of the frame, means mounted on said frame for rotating one of said pairs of sprockets to drive said chains, and a plurality of material conveying flights extending transversely between and connected at uniformly spaced intervals to said chains for movement thereby to move material longitudinally of the frame when positioned in the car.

20. A device for unloading bulk material from a car through a doorway in one side wall thereof, comprising a stationary guide adjacent said one side wall of the car, a mast mounted for vertical movement only in said guide, a supporting arm mounted on said mast for pivotal movement relative thereto about a vertical axis and for vertical movement with the mast, said supporting arm having a plurality of pivotally connected sections, separate means for effecting relative pivotal movement between each pair of connected arm sections to swing the free end portion of the arm into the interior of the car through said doorway, means for raising and lowering said mast in said guide to adjust the height of said supporting arm, an elongated frame, means for suspending said frame from the free end portion of the arm for horizontal movement longitudinally thereof, said frame being vertically movable by vertical movement of said mast, a rotatable shaft mounted longitudinally of said frame, a helical material conveying flight mounted on said shaft, means for rotating said shaft to cause said flight to move material longitudinally of the frame when positioned in the car, and a breaker blade mounted on the outer end portion of said shaft for breaking up coalesced masses of material in the car.

References Cited in the file of this patent

UNITED STATES PATENTS

| | | |
|---|---|---|
| 632,202 | Phillips et al. | Aug. 29, 1899 |
| 1,332,662 | Gross | Mar. 2, 1920 |
| 1,505,476 | London | Aug. 19, 1924 |
| 1,521,290 | Hague | Dec. 30, 1924 |
| 2,073,793 | Gyger | Mar. 16, 1937 |
| 2,272,949 | Kidder | Feb. 10, 1942 |
| 2,655,275 | Thompson | Oct. 13, 1953 |